US009239992B2

(12) United States Patent
Valentino

(10) Patent No.: US 9,239,992 B2
(45) Date of Patent: Jan. 19, 2016

(54) METHOD AND SYSTEM FOR GENERATING 3D SEATING MAPS

(71) Applicant: CEATS, INC., Las Vegas, NV (US)

(72) Inventor: Valeno J. Valentino, Rancho Santa Fe, CA (US)

( * ) Notice: Subject to any disclaimer, the term of this patent is extended or adjusted under 35 U.S.C. 154(b) by 183 days.

(21) Appl. No.: 13/856,930

(22) Filed: Apr. 4, 2013

(65) Prior Publication Data

US 2013/0268899 A1 Oct. 10, 2013

Related U.S. Application Data

(60) Provisional application No. 61/641,746, filed on May 2, 2012, provisional application No. 61/621,305, filed on Apr. 6, 2012.

(51) Int. Cl.
*G06F 15/00* (2006.01)
*G06F 13/00* (2006.01)
*G06Q 10/02* (2012.01)

(52) U.S. Cl.
CPC ...................................... *G06Q 10/02* (2013.01)

(58) Field of Classification Search
CPC ........................... G06F 3/04815; G06Q 10/02
USPC ................. 715/757, 856, 733, 747, 769, 771, 715/853–855
See application file for complete search history.

(56) References Cited

U.S. PATENT DOCUMENTS

2003/0067464 A1 4/2003 Gathman et al.
2003/0069762 A1 4/2003 Gathman et al.
2003/0069763 A1 4/2003 Gathman et al.
2003/0069764 A1 4/2003 Gathman et al.
2003/0069789 A1 4/2003 Gathman et al.
2003/0069810 A1 4/2003 Gathman et al.
2003/0069827 A1 4/2003 Gathman et al.
2003/0069829 A1 4/2003 Gathman et al.
(Continued)

FOREIGN PATENT DOCUMENTS

KR 10-2009-0002440 A 1/2009
WO WO 03/032215 4/2003
WO WO 2011/159811 12/2011

OTHER PUBLICATIONS

International Search Report and Written Opinion, re PCT Application No. PCT/US2013/035318, mailed Jul. 29, 2013.

*Primary Examiner* — Kevin Nguyen
(74) *Attorney, Agent, or Firm* — Knobbe, Martens, Olson & Bear, LLP

(57) ABSTRACT

Embodiments of systems and methods are described for allowing a user to purchase a ticket. In some implementations, a system comprises a data store and a processor. The data store stores one or more program instructions which, when executed by the processor, cause the processor to perform several functions. For example, the processor constructs first data configured to cause an application executing on a computing device to generate a three-dimensional graphical representation of a venue in a first view, receives a selection of a section of seats in the venue from the application, and constructs second data configured to cause the application to generate a graphical representation of the selected section in the first view. The graphical representation of the selected section comprises a graphical representation of rows of seats in the selected section and an image representative of a view from a selected row.

24 Claims, 34 Drawing Sheets

(56) References Cited

U.S. PATENT DOCUMENTS

| | | |
|---|---|---|
| 2007/0265892 A1 | 11/2007 | Valentiono |
| 2008/0255889 A1 | 10/2008 | Geisler et al. |
| 2008/0319803 A1 | 12/2008 | Heyraud et al. |
| 2009/0256839 A1* | 10/2009 | Bastian .................. 345/419 |
| 2010/0138874 A1 | 6/2010 | Deutschman |
| 2011/0072367 A1* | 3/2011 | Bauer ..................... 715/757 |
| 2011/0196754 A1 | 8/2011 | Proud et al. |
| 2012/0022901 A1 | 1/2012 | Nasr et al. |
| 2012/0078667 A1 | 3/2012 | Denker et al. |

* cited by examiner

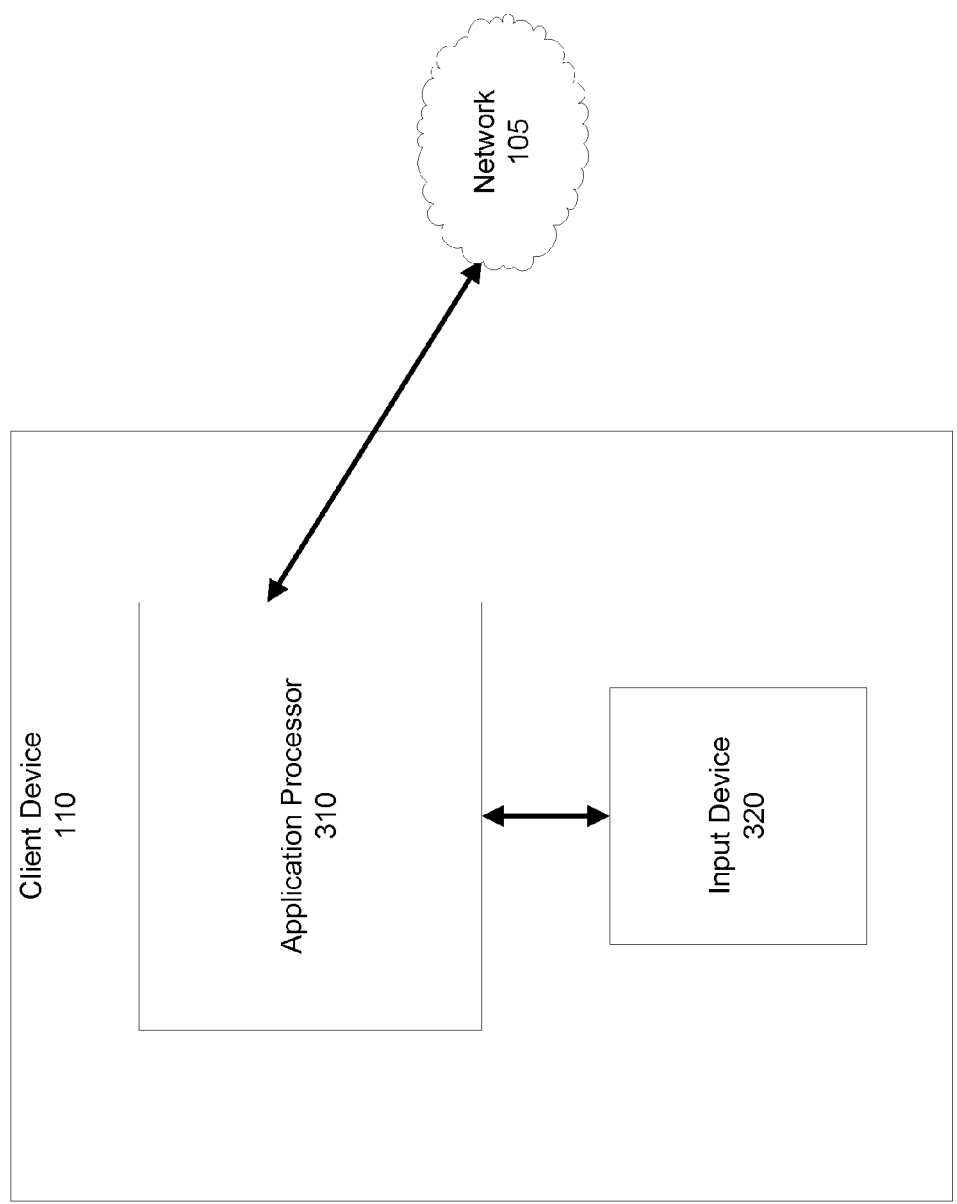

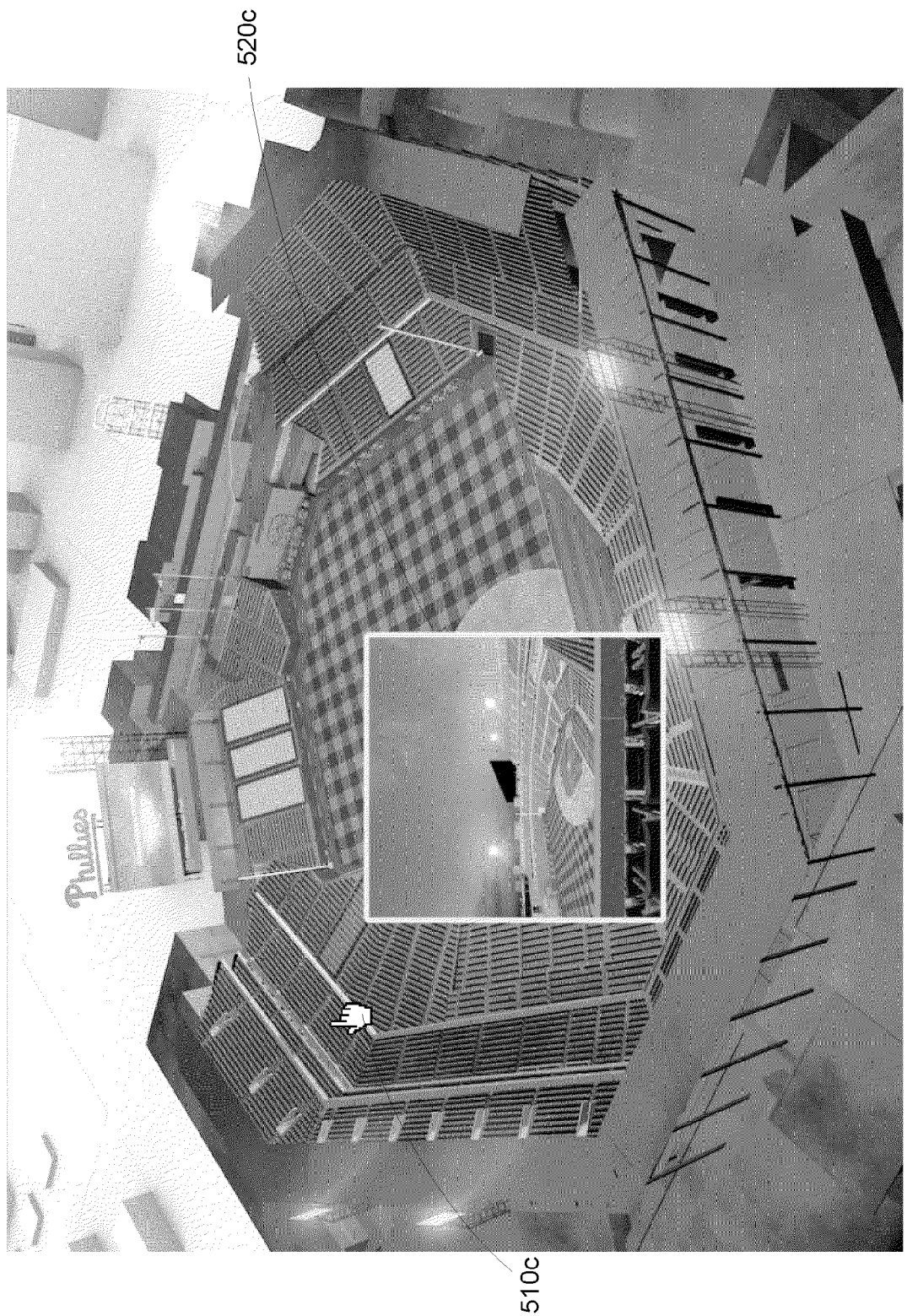

FIG. 9A

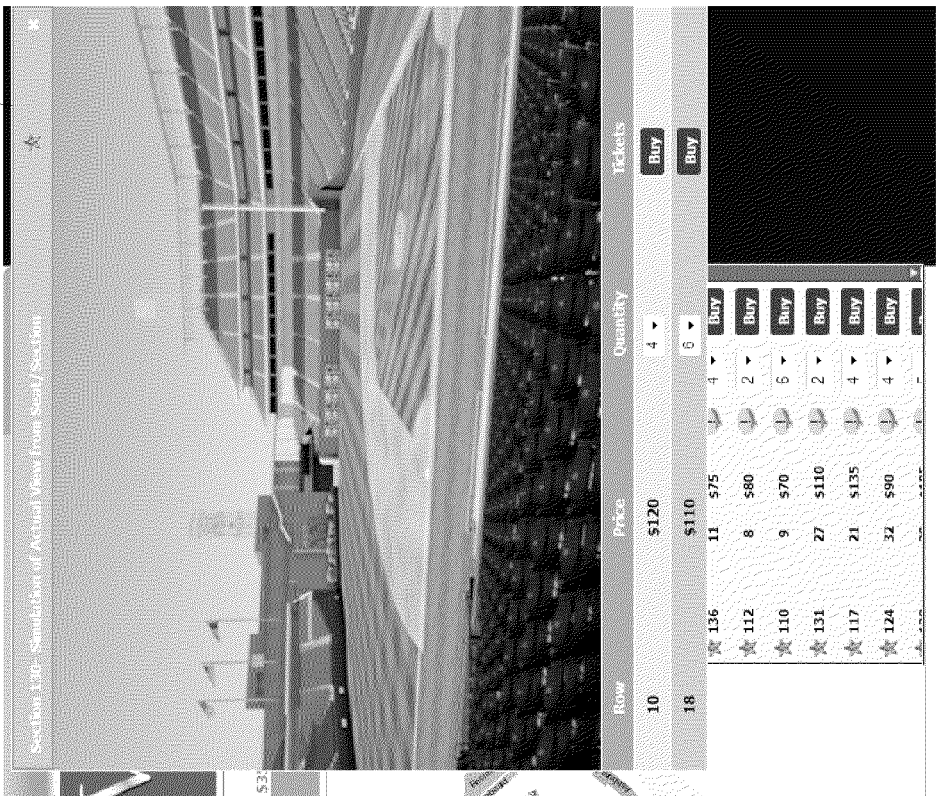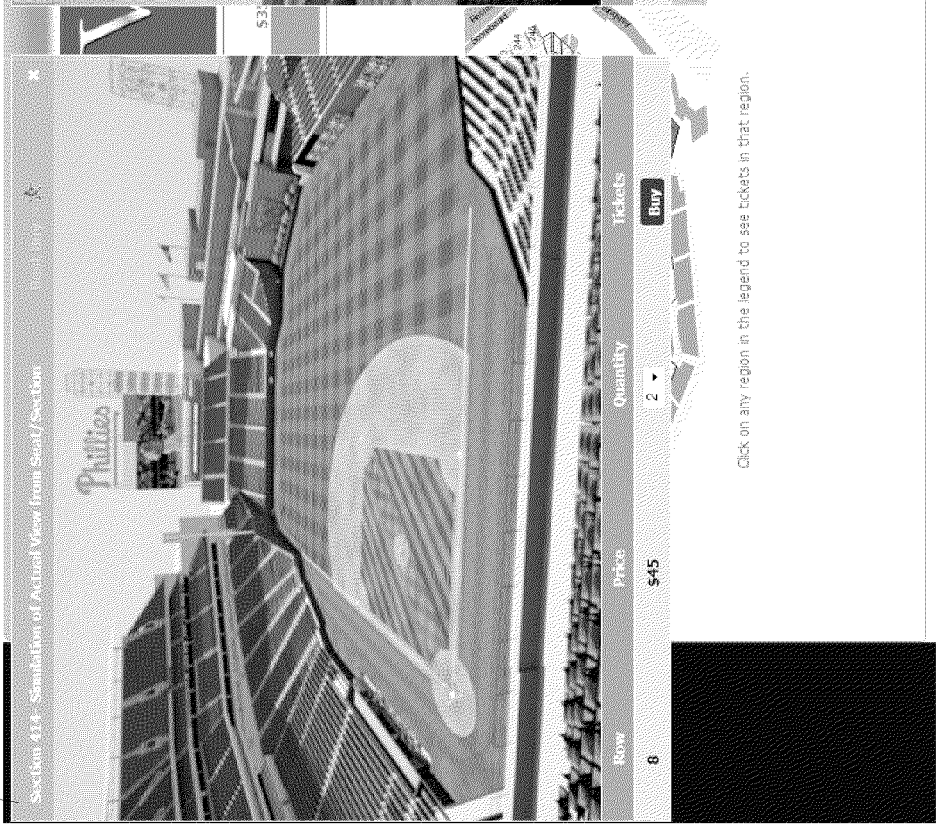
FIG. 9C

METHOD AND SYSTEM FOR GENERATING 3D SEATING MAPS

CROSS-REFERENCE TO RELATED APPLICATIONS

This application claims priority under 35 U.S.C. §119(e) to U.S. Provisional Patent Application No. 61/621,305, entitled "METHOD AND SYSTEM FOR GENERATING 3D SEATING MAPS" and filed on Apr. 6, 2012, and to U.S. Provisional Patent Application No. 61/641,746, entitled "METHOD AND SYSTEM FOR GENERATING 3D SEATING MAPS" and filed on May 2, 2012, both of which are incorporated by reference in their entireties.

FIELD

The present disclosure relates generally to a system for purchasing tickets over a network. More specifically, the disclosure is directed to systems and methods for allowing a user to view graphical representations of a venue when purchasing tickets for the venue over a network.

BACKGROUND

Currently, a consumer may electronically purchase tickets to attend an event at a venue through the Internet. A web-based system may allow the consumer to choose an event from a variety of events and to choose a date that the consumer would like to attend. In addition, the consumer may be able to view a high-level floor plan of the venue where the venue is divided into sections. The web-based system may indicate the sections in which seats are available and the consumer may be able to purchase tickets for any of the available seats. These web-based systems may be useful for those consumers who previously have attended a venue. However, consumers who have never attended the venue or consumers who have never sat in the particular section are not sure exactly what their seats offer.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

As discussed above, some consumers have never attended a venue and/or have never sat in a particular section of the venue. These consumers may be wary of purchasing tickets via a web-based system if they are unsure whether the seats have a good view of the performance or event that will be held at the venue.

Accordingly, the systems and methods described herein facilitate the use of three dimension (3D) seating maps to provide consumers with a better understanding of what the view may look like from a selected set of seats. For example, a consumer may purchase tickets electronically via a computing device that connects to a server configured to allow users to purchase tickets for an event. The computing device may be configured to generate a graphical user interface (GUI) that displays a 3D seating map of the venue. The 3D seating map may be interactive such that the consumer can navigate through the venue and select one or more sections of the venue. Once a section is selected, a zoomed out portion of the section may be displayed within the GUI. The zoomed out portion may include information about seats that are available in the section, a graphical representation of one or more rows in the section, and an image representative of a view from the section.

The graphical representation of one or more rows in the section may also be interactive. For example, the consumer may select a row or a specific seat in a row. Once the selection is made, the image may change to correspond with the row and/or specific seat. In other words, the image may change such that it is representative of a view from the row and/or specific seat.

The systems and methods described herein may also provide other benefits to enhance the consumer's experience. For example, the consumer may be able compare the views from two or more different sections, move the zoomed out portions within the GUI, view a history of tickets previously purchased by the consumer or sections and/or seats previously viewed by the consumer, provide voice commands to purchase tickets, receive visual and/or aural feedback related to a section or seat of a venue, and the like.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3 is a more detailed block diagram of a client device.

FIGS. 4A-B illustrate an example electronic ticketing agency website viewed through a browser.

FIG. 5C illustrates another representation of a venue.

FIGS. 9A-D illustrate another example electronic ticketing agency website viewed through a browser.

FIGS. 10A-D illustrate another example electronic ticketing agency website viewed through a browser.

DETAILED DESCRIPTION

Embodiments of systems and methods are described for generating and using three dimension (3D) seating maps to allow consumers to electronically purchase tickets. Generally, aspects of the disclosure describe a system in which consumers can select and view the exact seat or seats that they are considering for purchase. The system can generate 3D graphical renderings of the venue and display these 3D renderings to the consumers. The consumers can navigate the 3D renderings to see what the view would look like from the seat or seats they are considering for purchase. Likewise, the consumers can see multiple 3D renderings at once in order to compare views.

Various aspects of the disclosure will now be described with regard to certain examples and embodiments, which are intended to illustrate but not to limit the disclosure. Although the examples and embodiments described herein relate to ticketing for a sports arena, the embodiments may similarly be applied to other fields in which tickets and seats or similar items are purchased, such as theaters, concert halls, transportation vehicles, hotels, cruise ships, office spaces, storage compartments, and the like.

Figure 1:
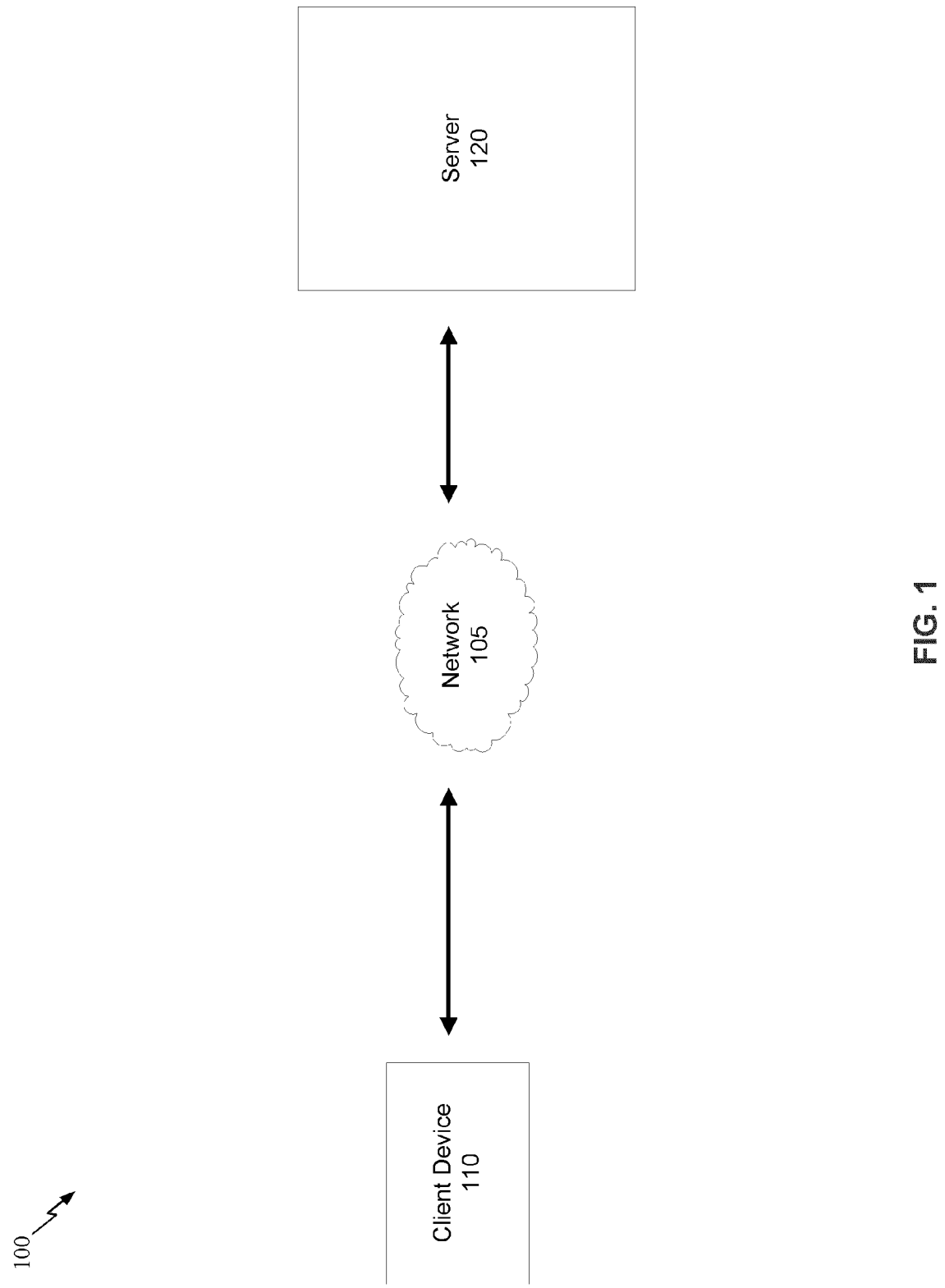
FIG. 1 is a block diagram of a communications system.

FIG. 1 is a block diagram of a communications system 100. Communications system 100 can include a network 105, a server 120, and/or a client device 110. While FIG. 1 illustrates one client device 110, this is not meant to be limiting as it should be apparent to one skilled in the art that communications system 100 can include any number of client devices 110.

Network 105 can include any communications network, such as the Internet. Network 105 can be a wired network, a wireless network, or a combination of the two. For example, network 105 can be a local area network (LAN) and/or a wireless area network (WAN).

Client device 110 can include any computing device. In an embodiment, client device 110 can include a portable device, such as a portable electronic device. For example, client device 110 can include a cell phone, a smart phone, a tablet, a laptop, a personal digital assistant (PDA), a pager, or the like. In another embodiment, client device 110 can include a stationary computing device, such as a desktop, a workstation, or the like. The client device 110 can communicate with server 120 through network 105. The client device 110 can include a display and one or more input devices to allow a user to interact with it. The client device 110 can be configured to allow a user to communicate with the server 120 in order to view available seats in a venue for a particular event(s) on a particular date(s) and to purchase one or more seats. For example, the user, through the client device 110, can transmit to the server 120 a request for available seats. The client device 110 can be configured to display the venue, indicate seat availability, and allow a user to select one or more seats. Upon seat selection, the client device 110 can communicate with the server 120 in order to select the chosen seat(s) and transmit payment information to complete the transaction.

Server 120 can be a computing device that can communicate with the client device 110 through network 105. The server 120 can include one or more processors to execute one or more instructions, memory, and communication devices to transmit and receive data over the network 105. In an embodiment, the server 120 can be configured to generate 2D and/or 3D seating maps. The server 120 can also be configured to allow users, such as a user using the client device 110, to purchase electronically tickets for an event.

Figure 2:
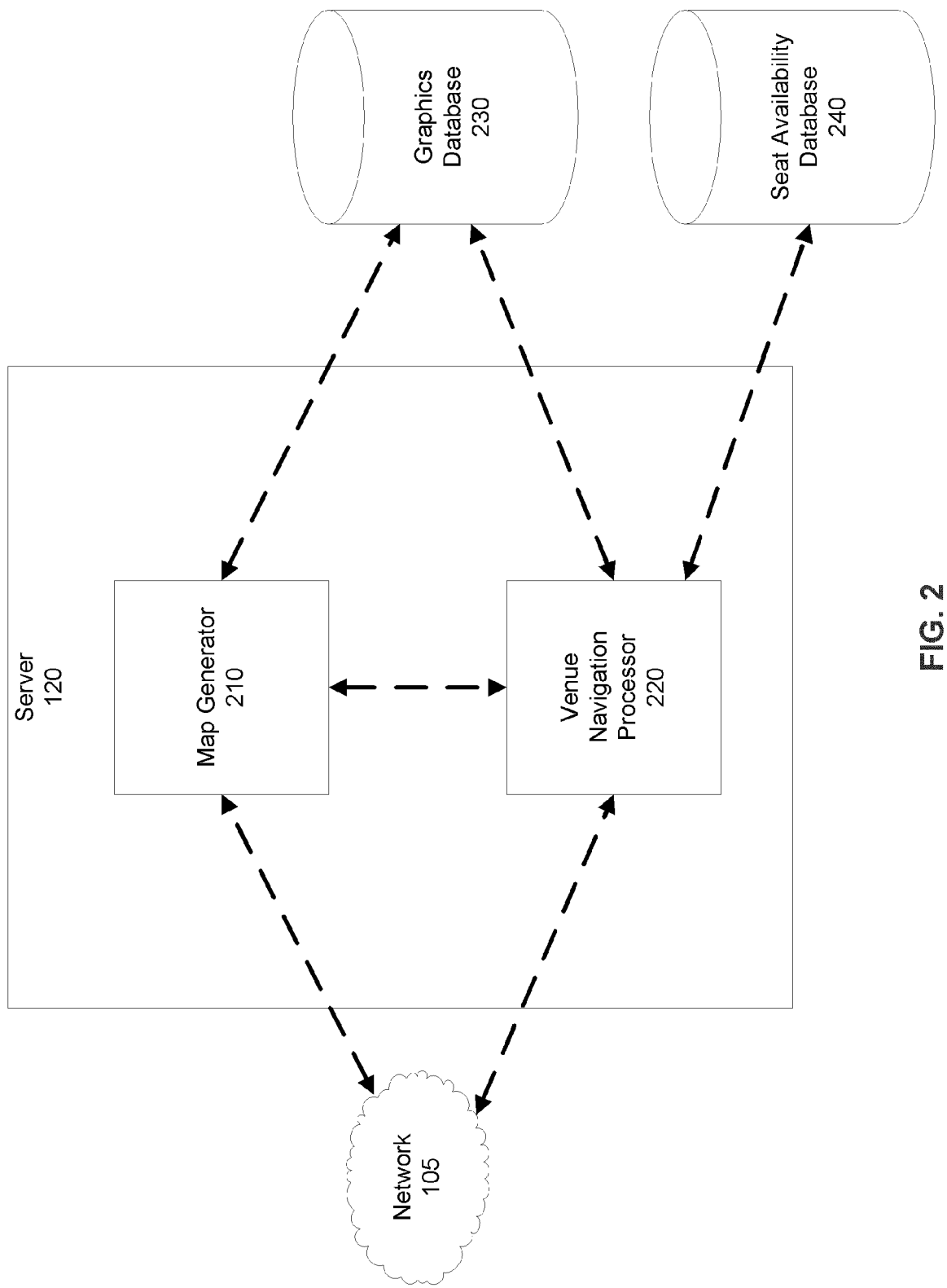
FIG. 2 is a more detailed block diagram of a server as illustrated in FIG. 1.

FIG. 2 is a more detailed block diagram of a server, such as server 120 as illustrated in FIG. 1. In an embodiment, the server 120 can include a map generator 210 and a venue navigation processor 220. In some aspects, map generator 210 and/or venue navigation processor 220 communicate with a graphics database 230. Although in the embodiment shown, the map generator 210 and the venue navigation processor 220 are depicted as being separate modules comprised in one server 120, in alternate embodiments the map generator 210 and/or the venue navigation processor 220 can be embodied separately or together and can be embodied in one or more server devices. Note also that the map generator 210 and the venue navigation processor 220 can communicate directly with a graphics database 230 via a wired or wireless connection or indirectly via a network, such as network 105. Likewise, the venue navigation processor 220 can communicate directly with a seat availability database 240 via a wired or wireless connection or indirectly via a network, such as network 105.

The server 120 may further comprise additional modules and components, either within the same computing device as the map generator 210 and/or venue navigation processor 220, or on separate devices. For example, the server may include modules for reserving seats, generating reservations, processing payments, generating tickets, viewing or changing existing reservations, and so on, in addition to map generator 120 and venue navigation processor 220. The server 120 may include any subset of the aforementioned modules.

Map generator 210 can be a module configured to generate 2D and/or 3D graphical representations of venues, such as arenas, stadiums, concert halls, theaters, and the like. The representations can include a graphical representation of sections, seats, a stage, a floor, a field, aisles, stairs, a skyline, and/or lighting of the venue.

In an embodiment, map generator 210 can receive venue parameters from a device in communication with the server 120 (not shown) in order to generate the 2D and/or 3D graphical representations. For example, the device can communicate with the server 120 directly via a wired or wireless connection or indirectly via a network, such as network 105. The venue parameters can include photographs of the venue, architectural designs (e.g. floor plans) of the venue, seat dimensions, a number of sections in a venue, a number of seats in a section, a height of a section, a slope of a section, dimensions of a stage, dimensions of a floor, dimensions of a field, lighting effects in a venue, dimensions of a building adjacent or near a venue, dimensions and/or types of advertisements in a venue, a spatial relationship between objects in a venue, colors of objects in a venue, and the like. Based on the received venue parameters, the map generator 210 can generate a 2D and/or 3D color and/or grayscale rendering of the venue. In some implementations, the map generator 210 transmits the renderings to the graphics database 230 for storage. In other implementations, the map generator 210 transmits the renderings to the venue navigation processor 220 for use by the venue navigation processor 220. Map generator 210 can be configured to transmit the renderings in a variety of formats, such as HTML, XML, SGML, VRML, SVG, DXF, and the like.

In an embodiment, the map generator 210 can generate the 2D and/or 3D renderings of the venue upon receiving the venue parameters. In another embodiment, the map generator 210 can generate the 2D and/or 3D renderings of the venue upon receiving a request from a user to view seats available at a particular venue for a particular event on a particular date.

Venue navigation processor 220 can be a module configured to execute instructions to generate an application that can run on the client device 110. In an embodiment, the application can be platform-independent, meaning it can run on any type of client device 110. The application can be generated such that a user can view a listing and/or pricing of available seats, browse through a graphical representation of the available seats, and choose a seat(s) for purchase directly through the application. In other words, once the client device 110 receives the application, the user can view the venue and select seats without the client device 110 and the server 120 exchanging information. As described herein, the application can also be called a venue viewer. In various embodiments, the application may be a standalone application, a browser applet, an HTML page with or without scripting code, or the like, as well as any combination of these.

The venue navigation processor 220 can receive 2D and/or 3D renderings of the venue from the map generator 210 and/or the graphics database 230. In an embodiment, the venue navigation processor 220 modifies the renderings to include additional information. For example, the venue navigation processor 220 can communicate with the seat availability database 240 to receive real-time information on seats that are available for a particular venue for a particular event on a particular date. The renderings can be modified to graphically indicate in which sections seats are available or not available and the prices of available seats. The venue navigation processor 220 can communicate with other databases or modules (not shown) to modify the renderings to include further information. For example, the venue navigation processor 220 can communicate with social media servers to graphically indicate, such as with an icon, the seats in which other users are sitting (e.g., in which seats friends or acquaintances of the user are sitting). The icon can be placed at or near the appropriate seat(s) and viewed by the user when the user is viewing a section from which the friend's seat can be viewed when at the venue. The venue navigation processor 220 can communicate with a history database to graphically indicate where the user (or other users) has sat during an event at the venue at a previous time. The venue navigation processor 220 can communicate with a ratings database to graphically indicate a rating given to the seat and/or section by users who have sat in the seats previously. Other information that can be included in the renderings include a graphical indication of which seats are handicap seats, which seats are closer to restrooms, which seats include view obstructions, and the like. In other embodiments, the client device 110 is configured to modify the renderings to include the additional and further information as described herein.

FIG. 3 is a more detailed block diagram of a client device, such as the client device 110 of FIGS. 1 and 2. The client device can include an application processor 310 and an input device 320. While FIG. 3 illustrates one input device 320, this is not meant to be limiting as it should be apparent to one skilled in the art that the client device 110 can include any number of input devices.

The application processor 310 can communicate with the server 120 through network 105. In an embodiment, the application processor 310 is configured to run an operating system, such as Windows, Unix, Mac OS, iOS, Android, Linux, or the like. The operating system can execute instructions to run applications on the client device 110. Outputs of the applications being run can be transmitted to a display (not shown) for displaying to the user of the client device 110. In some implementations, the operating system is configured to run a browser in a first application window, where the browser executes browser-executable code. For example, the operating system can run a browser that allows a user to navigate to a website hosted by the server 120. Based on browser-executable code or other instructions received from the website (through the server 120), the operating system can run the venue viewer in a separate, standalone application window.

Input device 320 can be any device that allows a user to interact with the client device 110. For example, an input device 320 can be a button, a mouse, stylus, keyboard, touch screen, microphone for voice commands, and/or the like. The input device 320 can be in communication with the application processor 310 to allow the user to interact with an application being executed, such as, for example, the venue viewer.

Figure 4A:
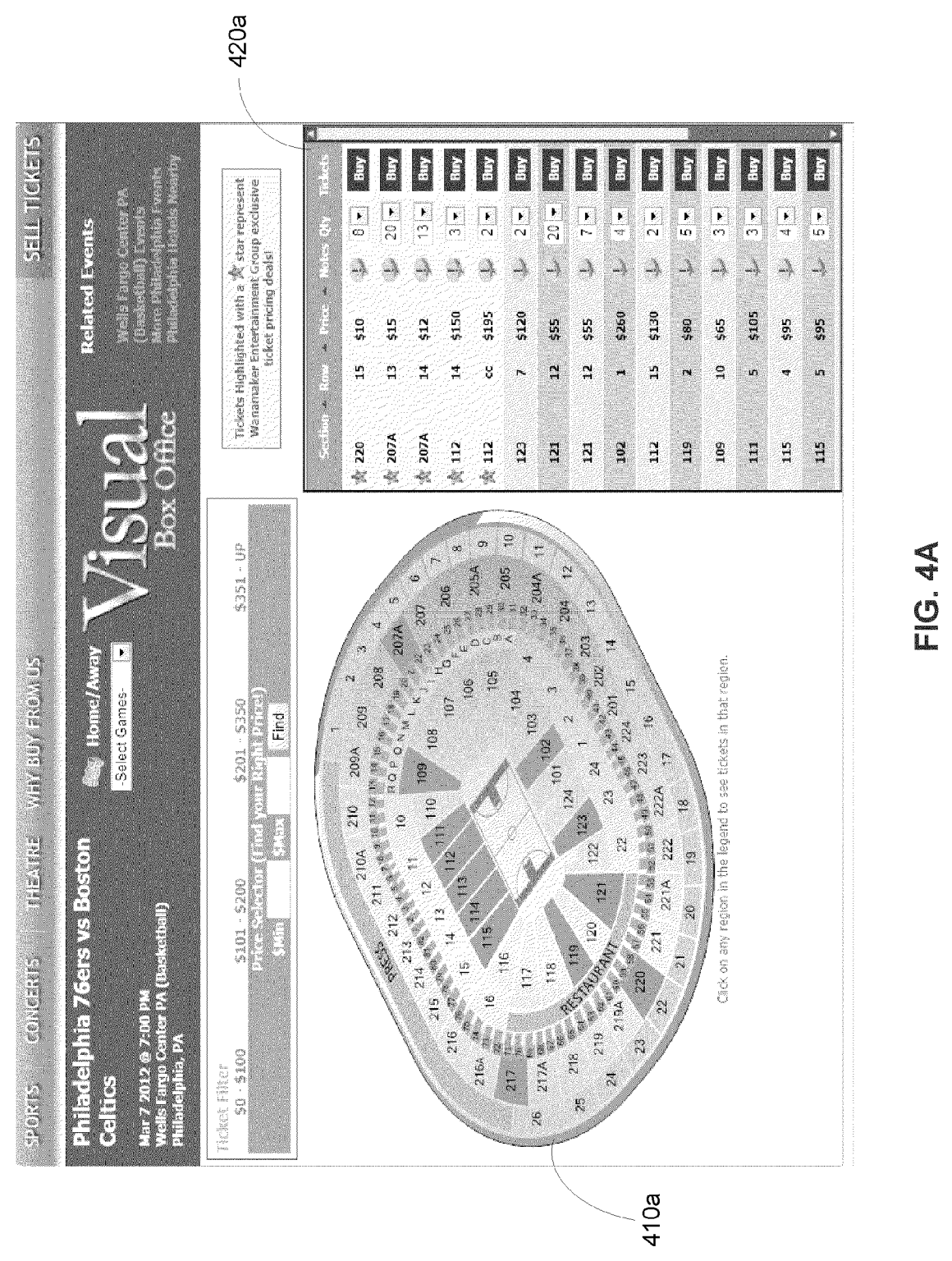
Figure 4B:
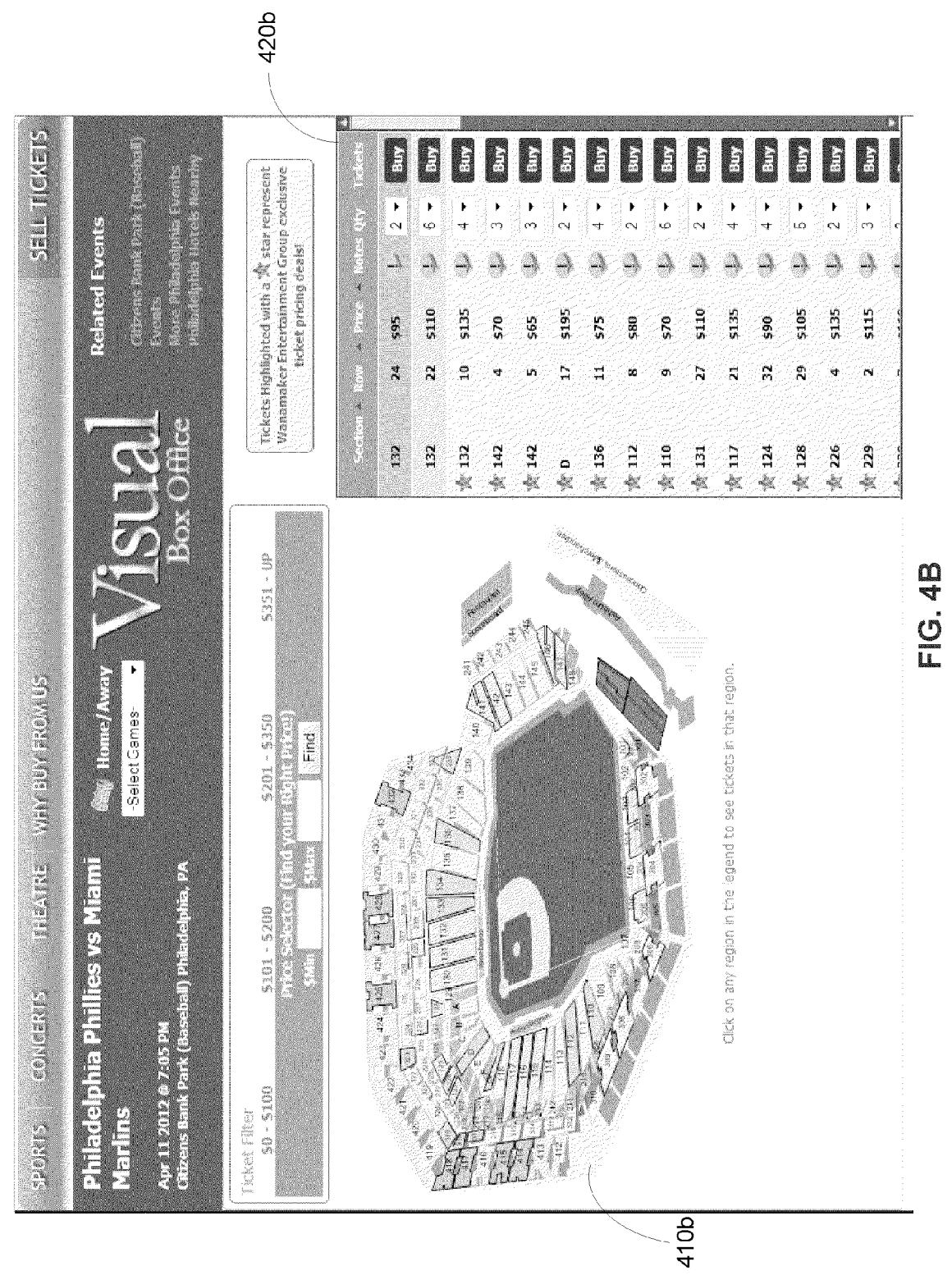
Figure 4C:
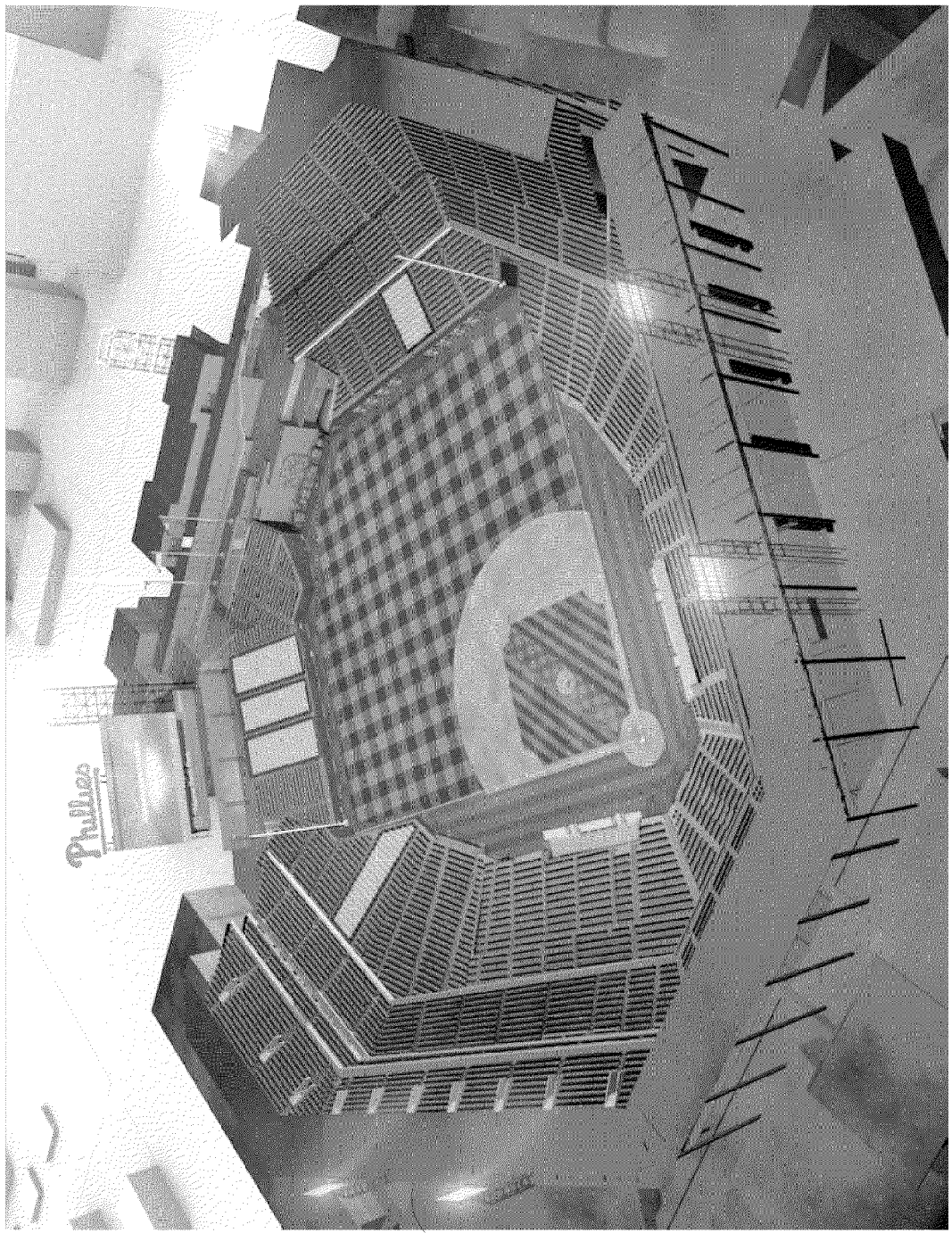
FIG. 4C illustrates a representation of a venue.

A user can navigate, via the browser, to an electronic ticketing agency website, such as an agency in which tickets are sold electronically through a network 105. FIGS. 4A-B illustrate an example electronic ticketing agency website viewed through a browser. Within the browser, the user can select, using input device 320, a venue, event, and/or date for which the user wishes to purchase tickets. For example, as illustrated in FIG. 4A, a user has chosen to view available seats for a basketball game at the Wells Fargo Center in Philadelphia on Mar. 7, 2012. Once the venue, event, and/or date has been chosen, the browser can display to the user a graphical representation of the venue 410*a* or 410*b*, including which seats are available and a price, such as in frame 420*a* or frame 420*b*. The graphical representation of the venue 410*a* or 410*b* can be a flat view, such as illustrated in FIG. 4A, or a perspective view (e.g., a view showing the height and/or slope of sections and/or seats), as illustrated in FIG. 4B. In further embodiment, the venue can be represented as a 3D model, such as venue 410*c* as illustrated in FIG. 4C.

Figure 5A:
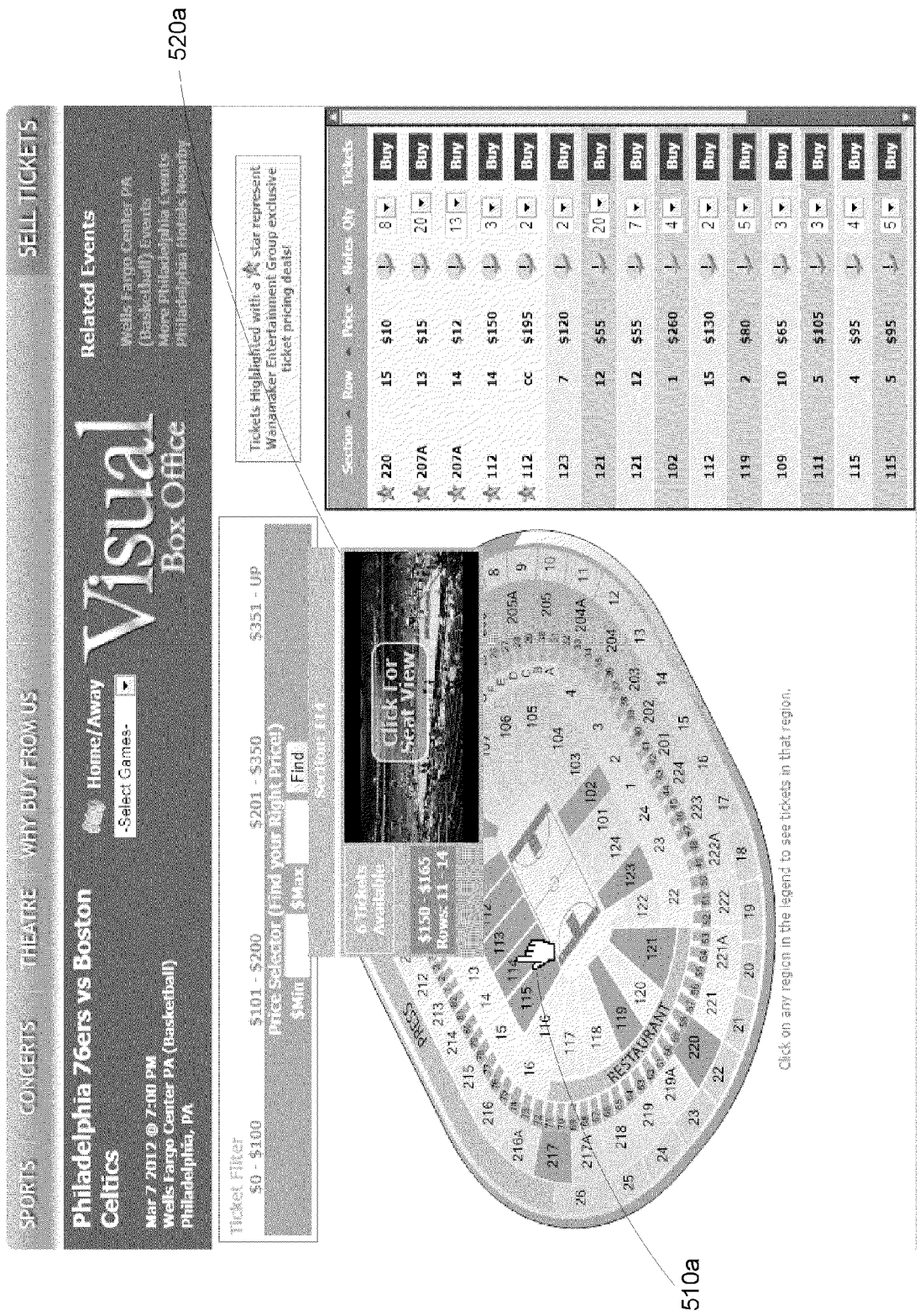
FIGS. 5A-B illustrate another example electronic ticketing agency website viewed through a browser.
Figure 5B:
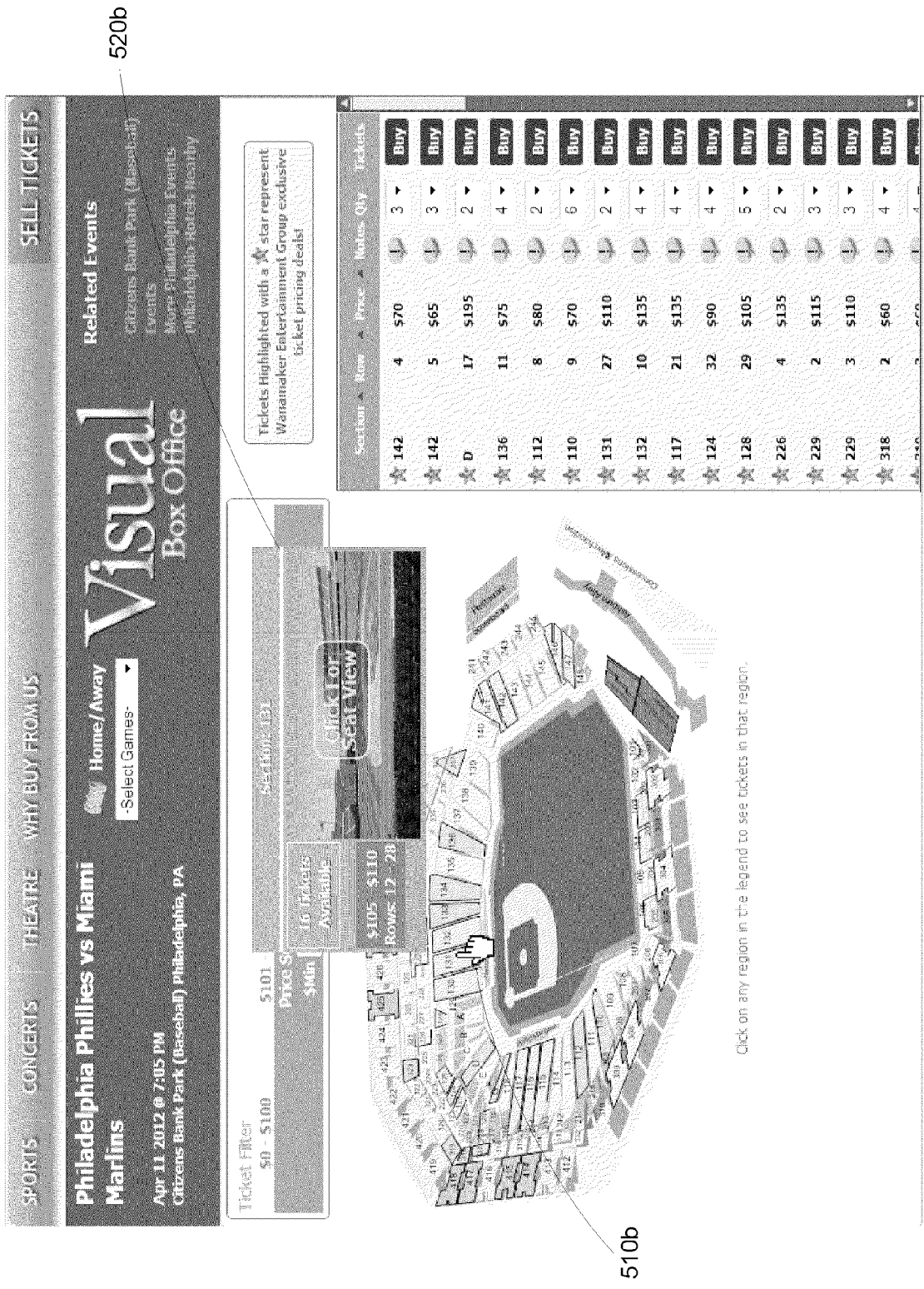

In an embodiment, a user may interact with the graphical representation of the venue in various ways. For example, upon moving a pointing indicator, such as a mouse cursor 510*a*, 510*b*, or 510*c* over a section and/or a seat of the venue, a scaled 2D and/or 3D rendering of the venue and/or a photograph of the venue can appear in a separate pop-up window 520*a*, 520*b*, or 520*c* as illustrated in FIGS. 5A-C. For example, pop-up window 520*a* displays a photograph of the venue, whereas pop-up windows 520*b* and 520*c* display a 2D and/or 3D rendering of the venue. The separate pop-up windows 520*a-c* can include additional information, such as a number of available seats in the section, where the seats are located, and/or a price range for the available seats. Note that the separate pop-up windows 520*a-c* can appear within the browser application window itself or in a different application window. In other embodiments, alternatives to pop-up windows may be used, such as separate tabs, screen overlays, sliding panels, and the like. For example, a mobile device may show separate windows using a horizontal or vertical scrolling display, which may advantageously require less display area.

Figure 6A:
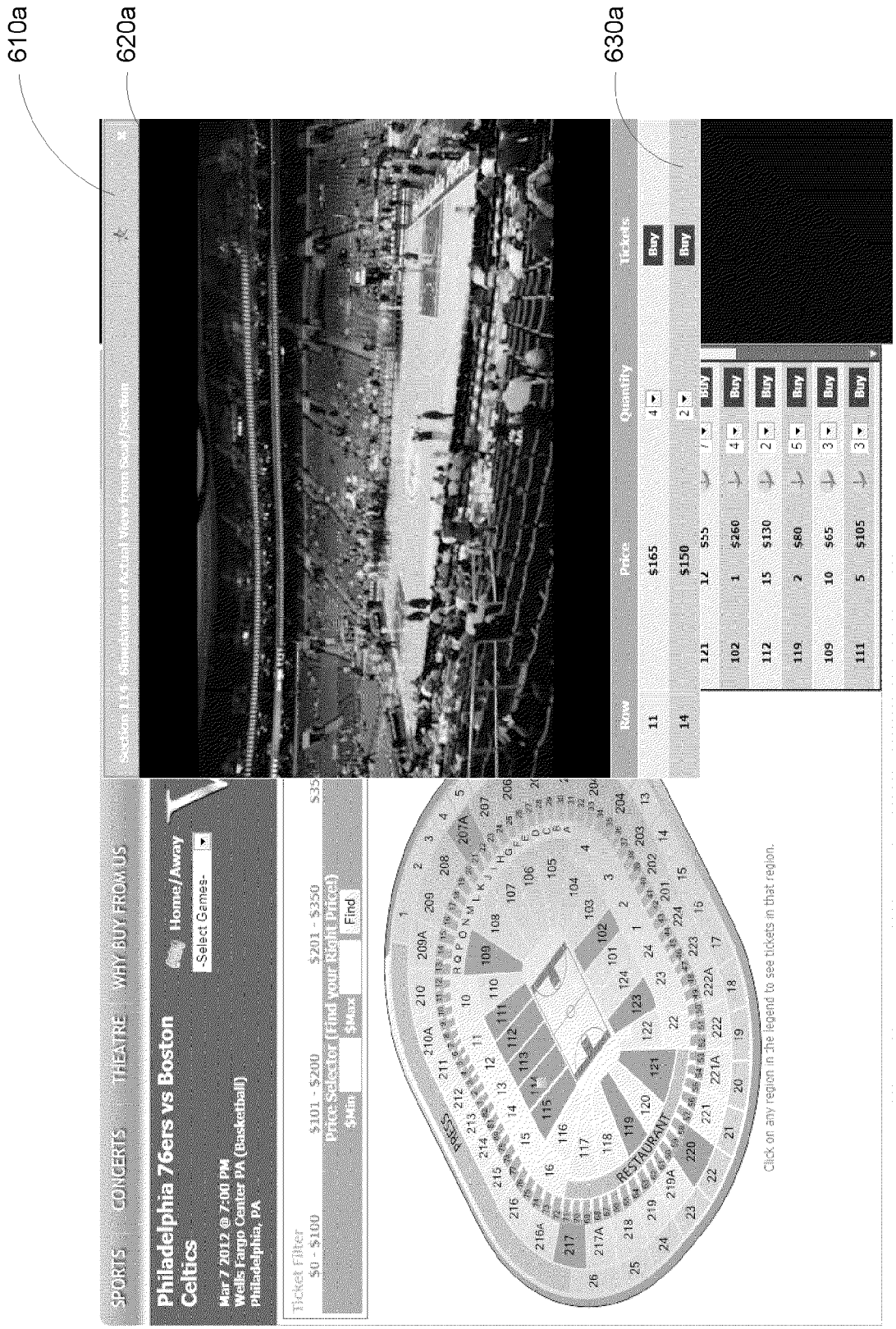
FIGS. 6A-B illustrate another example electronic ticketing agency website viewed through a browser.
Figure 6B:
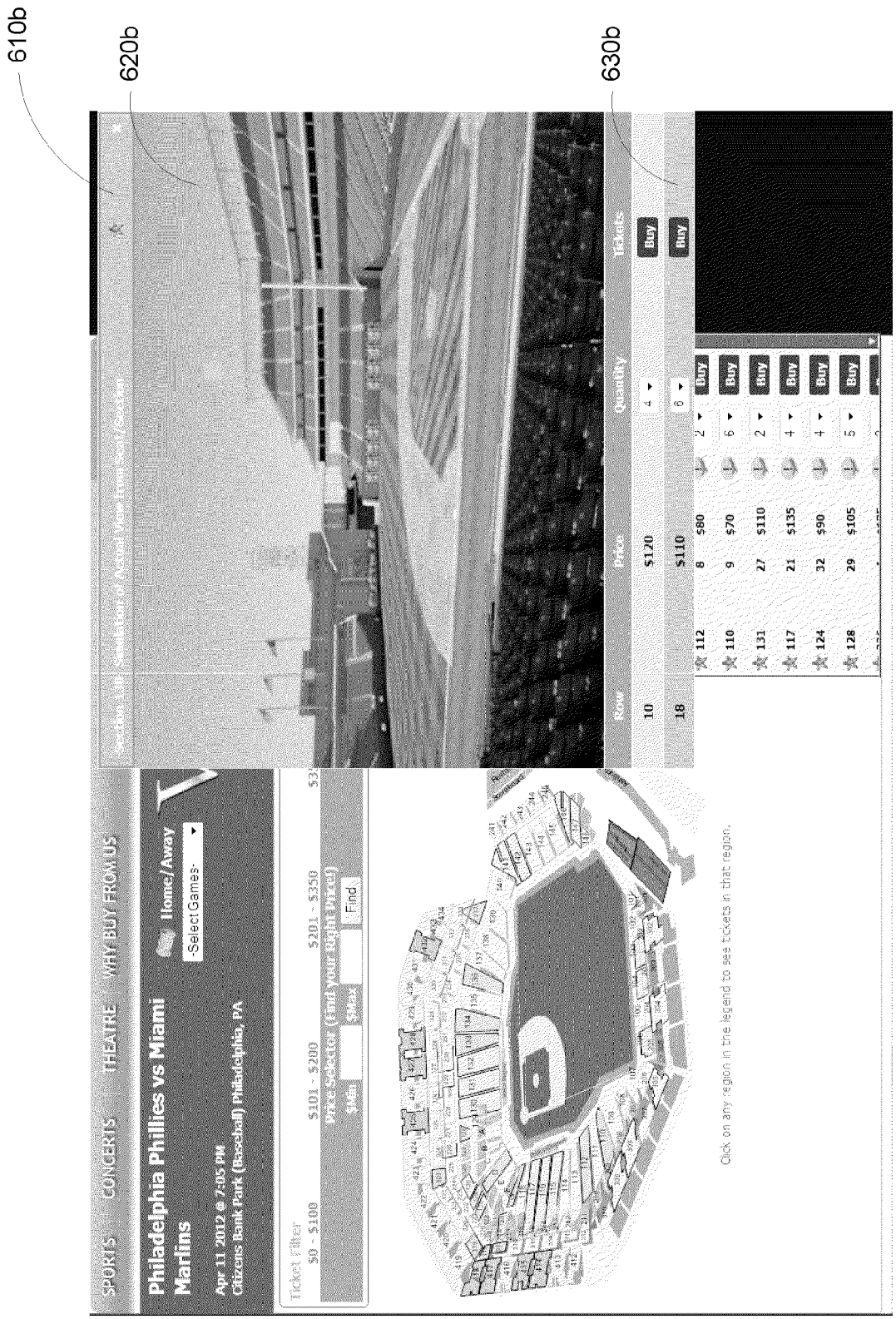
Figure 7A:
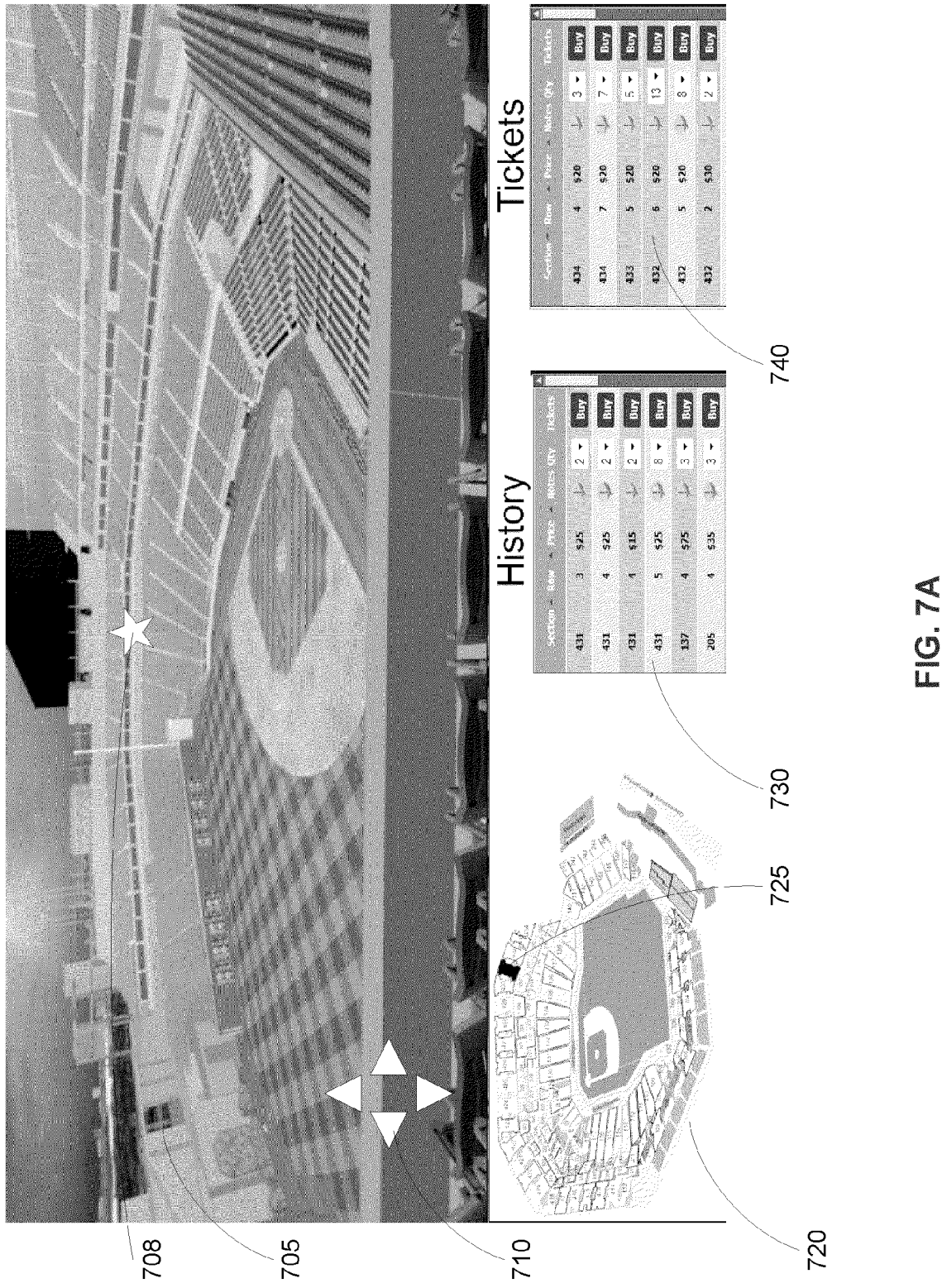
FIGS. 7A-D illustrate a more detailed view of a venue viewer of FIGS. 6A-B.
Figure 7B:
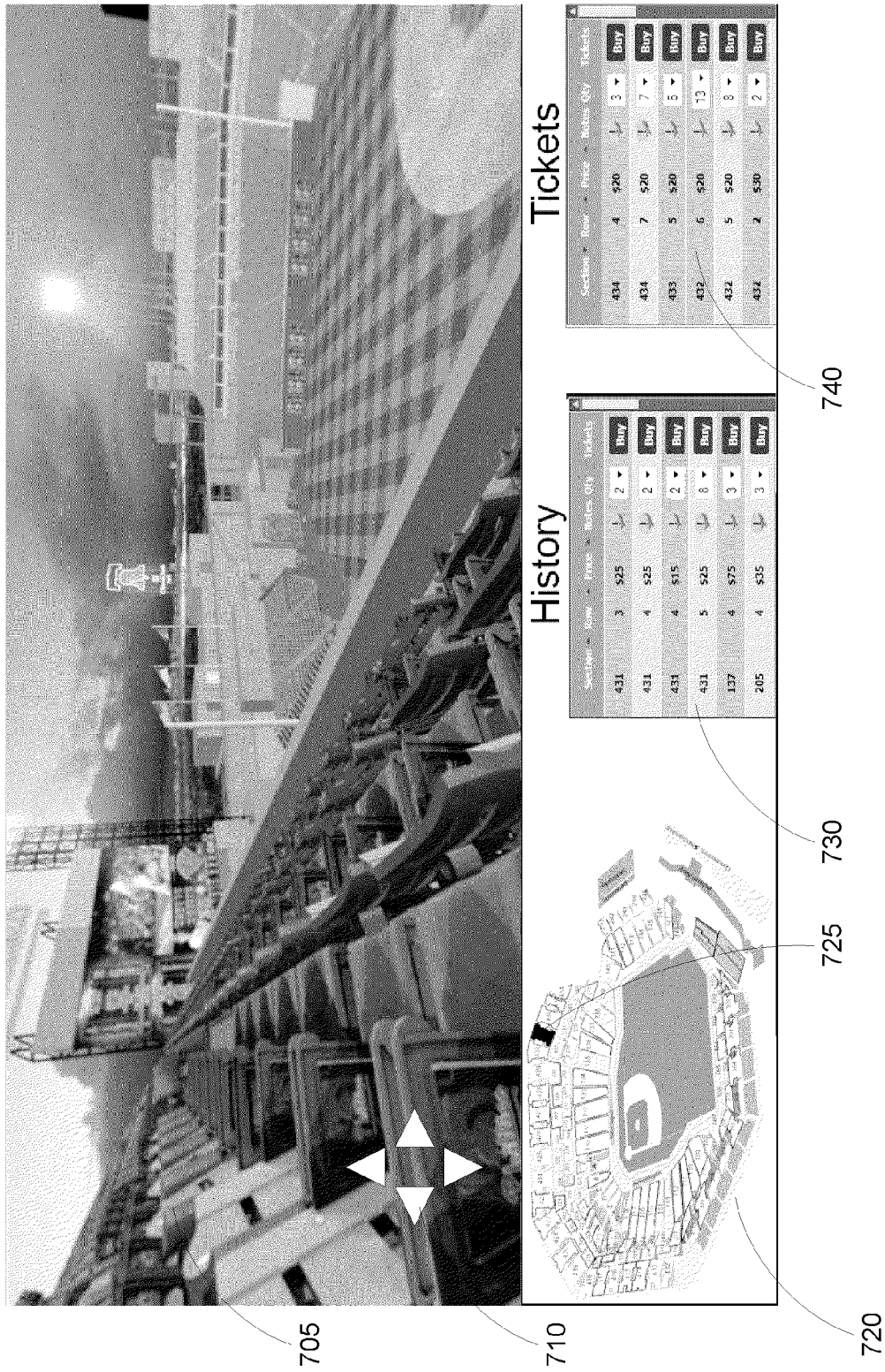
Figure 7C:
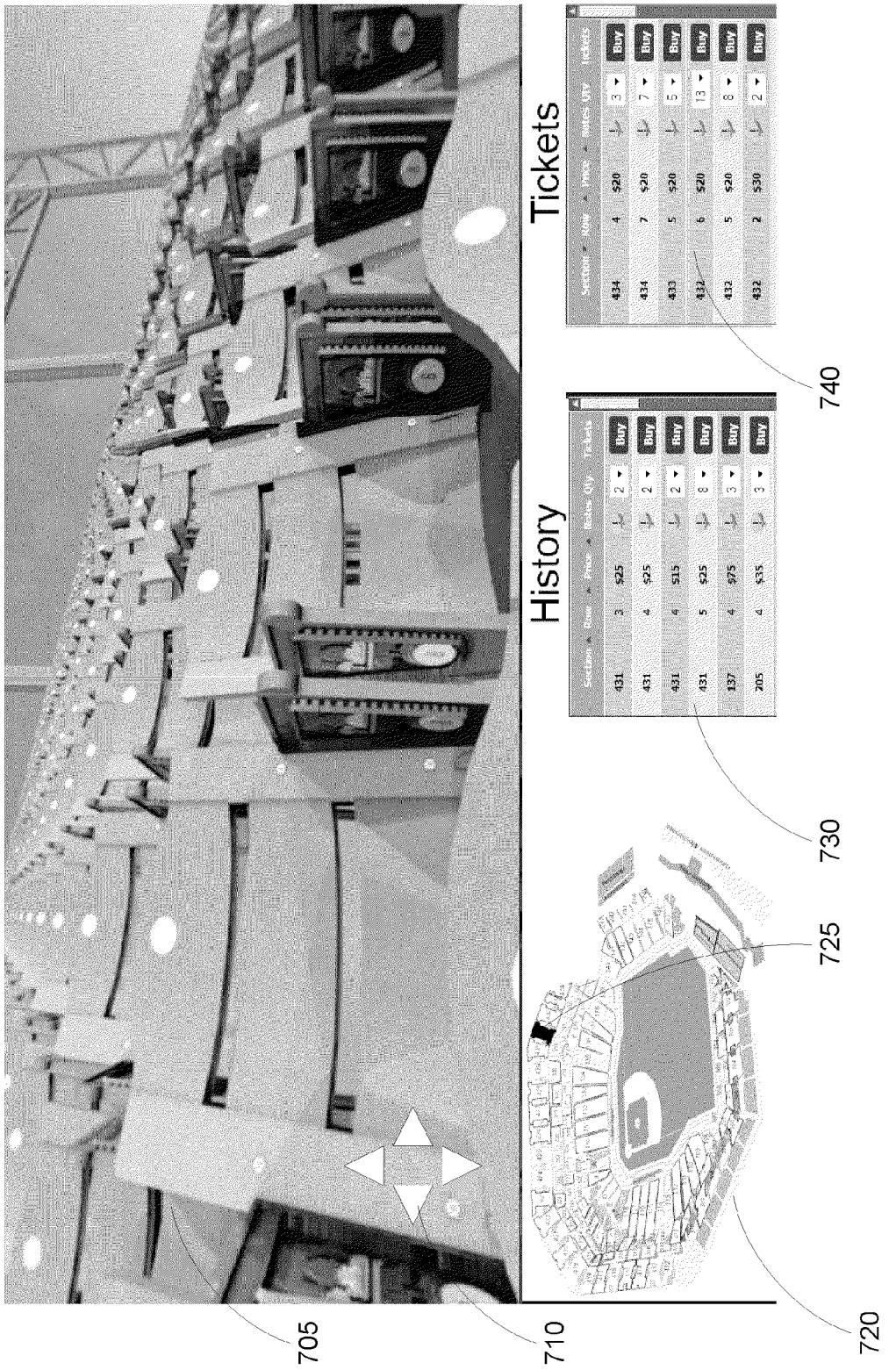
Figure 7D:
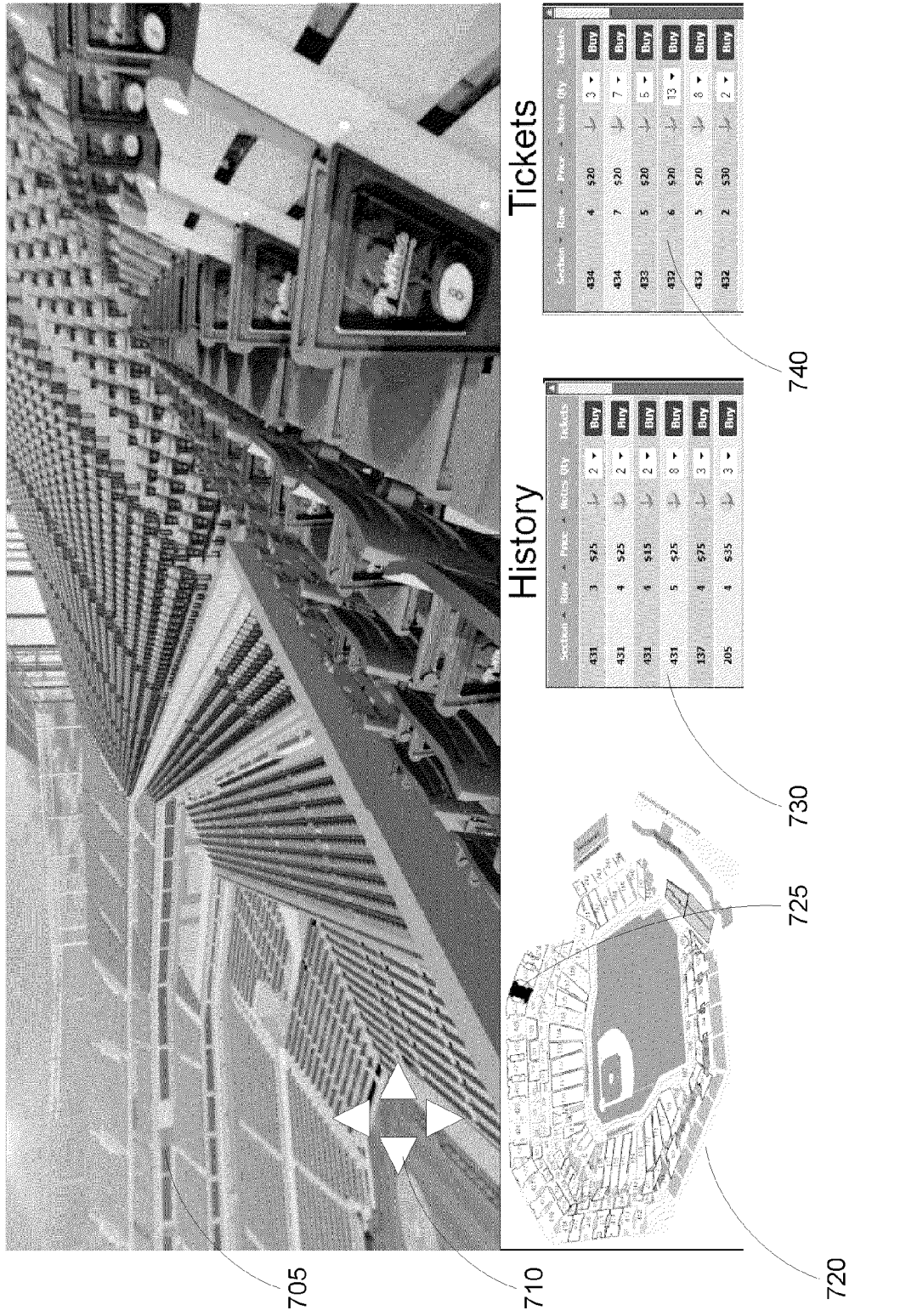

In an embodiment, if a user clicks or otherwise chooses a section and/or seat of the venue, a venue viewer 610*a* or 610*b* appears in a new application window as illustrated in FIGS. 6A-B. As described herein, once the venue viewers 610*a* and/or 610*b* are loaded, a user can view browse through various views of the section, browse through various views of other sections, see a list of available seats and/or pricing of available seats, and/or make a selection to purchase one or more tickets. Once the venue viewers 610*a* and/or 610*b* are loaded, the user can browse sections, see available seats, see current pricing, and make seat selections without the client device 110 having to make further communications with the server 120. In other words, once the client device 110 loads the venue viewers 610*a* and/or 610*b*, the client device 110 does not need to maintain a connection with the server 120.

However, the client device 110 may receive updated information from the server 120 and update the venue viewers 610a and/or 610b accordingly (e.g., tickets may be purchased by other users while a user is viewing the venue viewers 610a and/or 610b, and thus the venue viewers 610a and/or 610b may be updated to reflect the purchase, the price or other information associated with a seat may change while a user is viewing the venue viewers 610a and/or 610b, and thus the venue viewers 610a and/or 610b may be updated to reflect the new price and/or information, etc.). Once a user has made a selection of one or more seats to view more information and/or has made a selection of one or more seats to purchase one or more tickets, then the client device 110 can transmit such information to the server 120 (e.g., the client device 110 may inform the server 120 that the user has selected a seat to view more information and/or has selected a seat to purchase so that the server 120 can lock or otherwise prevent other users from selecting and/or purchasing the seat selected by the user).

The venue viewers 610a and 610b can include a larger version of a photograph of the venue and/or a larger version of the 2D and/or 3D rendering of the venue in a first frame 620a-b. In an embodiment, the photograph and/or rendering can provide a view to the user as if the user was sitting in the chosen section and/or seat. In a second frame 630a-b, the venue viewers 610a and/or 610b can include a list of available seats, where those seats are located, and pricings for those seats. In the second frame 630a-b, the user can choose a number of seats to purchase and click on a button to proceed with payment.

FIGS. 7A-D illustrate a more detailed view of a venue viewer, such as venue viewers 610a and/or 610b illustrated in FIGS. 6A-B. In an embodiment, the venue viewers 610a and/or 610b can include controls 710 to allow a user to rotate a default view of the section in frame 705 in an x, y, and/or z direction. A user can also zoom in and zoom out. In other embodiments, a user can rotate the default view in all directions (e.g., in an x, y, and/or z direction) by clicking in the frame 705 and dragging with a mouse or other pointing device (e.g., a finger, a stylus, etc.). Each of FIGS. 7A-D illustrates a different view of the venue from a chosen section and/or seat based on the use of controls 710 and/or based on clicking in the frame 705 and dragging.

The frame 705 can also indicate information graphically. For example, an icon or other such object, such as icon 708, placed at or near a section and/or seat can indicate that another user (such as the user's friend and/or acquaintance) purchased a seat in that section and/or at that seat. The frame 705 can indicate, with an icon or object placed at or near a seat and/or section, where the user (or other users) has sat during an event at the venue at a previous time. The frame 705 can indicate, with an icon or object (e.g., a number of stars, etc.) placed at or near a seat and/or section, a rating given to a seat and/or section. An icon, such as a handicap icon, can be placed at or near a seat and/or section in which handicap seats are available. An icon, such as a restroom icon, can be placed at or near a location of restrooms in the venue.

In an embodiment, the venue viewers 610a and/or 610b include a representation of the venue, such as venue graphic 720. The venue graphic 720 can indicate the section that is currently being viewed, such as with indicator 725, and allow a user to select another section to view. In further embodiments, the user can also select another section directly in frame 705 by pointing and/or clicking on a section that is visible in the view. Upon selecting another section to view, the view in frame 705 can transition to a view of the newly selected section. In this way, a user does not need to close the venue viewer 610a or 610b in order to see the view from another section of the venue.

In an embodiment, the venue viewers 610a and/or 610b include a history frame 730. The history frame 730 can indicate tickets previously purchased by the user (e.g., a number of tickets, where the tickets were located, the date those tickets were purchased, the date of the previous event, a rating given to those seats by the user, and the like). The history frame 730 can also indicate sections and/or seats previously viewed by the user during this session, along with the pricing information, a location of the seats, and/or a number of seats available.

In an embodiment, the venue viewers 610a and/or 610b include a tickets frame 740. The tickets frame 740 can indicate all seats available in the venue (e.g., organized by section, row, price, notes, quantity, etc.), all seats available in the section being viewed, selected seats available in the venue, and/or selected seats available in the section being viewed.

Figure 8:
FIG. 8 illustrates another example electronic ticketing agency website viewed through a browser.

FIG. 8 illustrates another example electronic ticketing agency website viewed through a browser. Once a user clicks or otherwise selects a section and/or seat of the venue, venue viewer 810 can load in a same or separate window. In an embodiment, the venue viewer 810 is similar to the venue viewer 610a as illustrated in FIG. 6A. The venue viewer 810 can be resized and/or repositioned by the user. For example, as illustrated in FIG. 8, the venue viewer 810 has been moved from an upper-right corner of the website to a lower-left corner of the website. The user may reposition windows using various forms of interaction via input devices, such as clicking and dragging with a mouse, dragging or gesturing via a touch screen, indicating via a voice command, or the like. In an embodiment, the application can automatically position and/or reposition windows. For example, the application may automatically position venue viewer 810 in a manner to ensure that parts of the overall display, such as the listing of available seats or the venue map, remain visible.

Figure 9A:
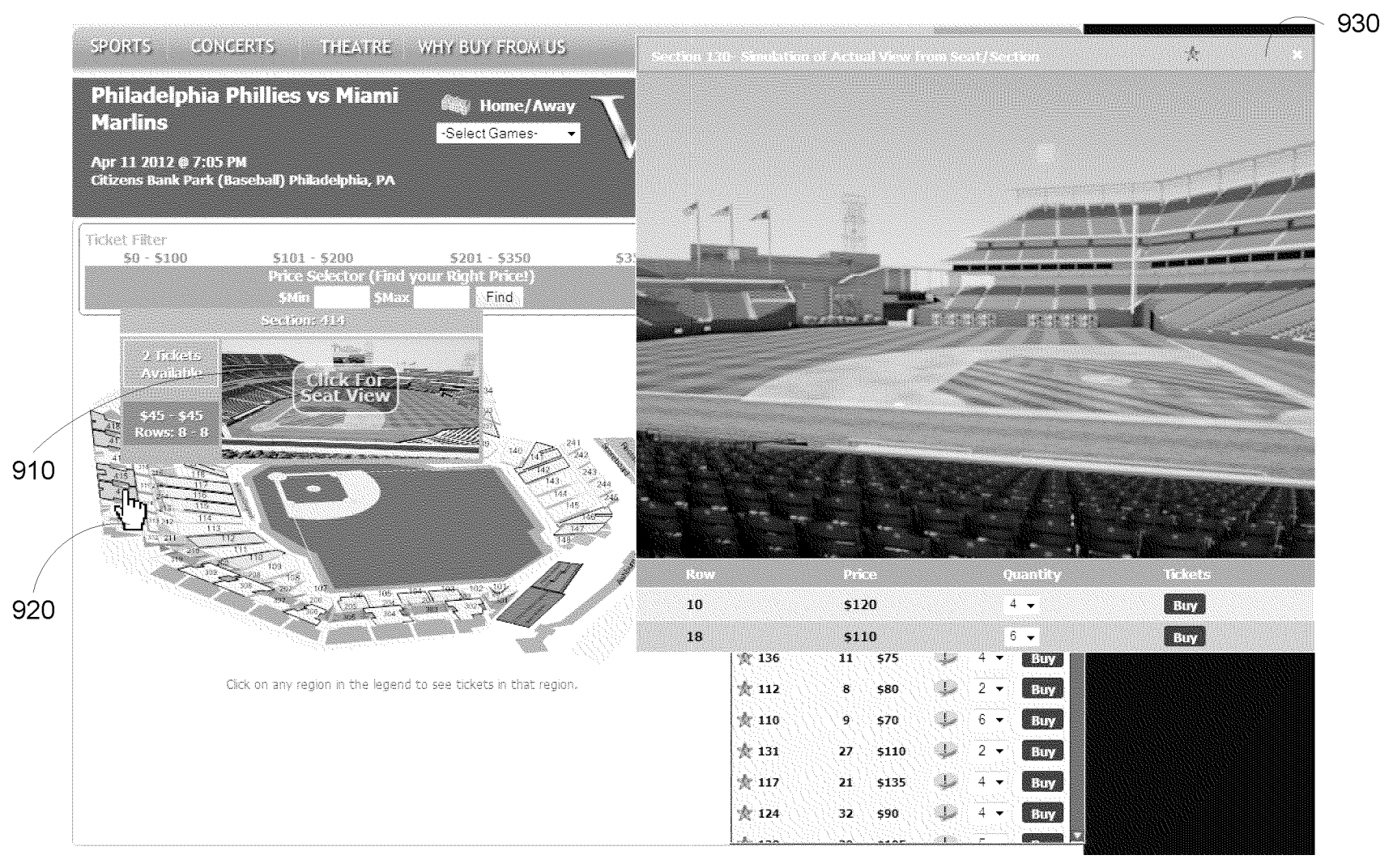

FIG. 9A illustrates another example electronic ticketing agency website viewed through a browser. Once a user clicks or otherwise selections a section and/or seat of the venue, venue viewer 930 loads in a same or separate window. The venue viewer 930, as illustrated in FIG. 9A, is in an upper-right corner of the website. If, for example, a user wants to compare a view, availability of seats, and/or pricings of one or more seats and/or sections, a user may select an additional section using cursor 920. In an embodiment, as the cursor 920 is hovered or moved over a seat and/or section, a pop-up window 910 appears. For example, pop-up window 910 displays a photograph of the venue and/or a 2D and/or 3D rendering of the venue. The separate pop-up window 910 can include additional information, such as a number of available seats in the section, where the seats are located, and/or a price range for the available seats. Note that the pop-up window 910 can appear within the browser application window itself or in a different application window.

Figure 9B:
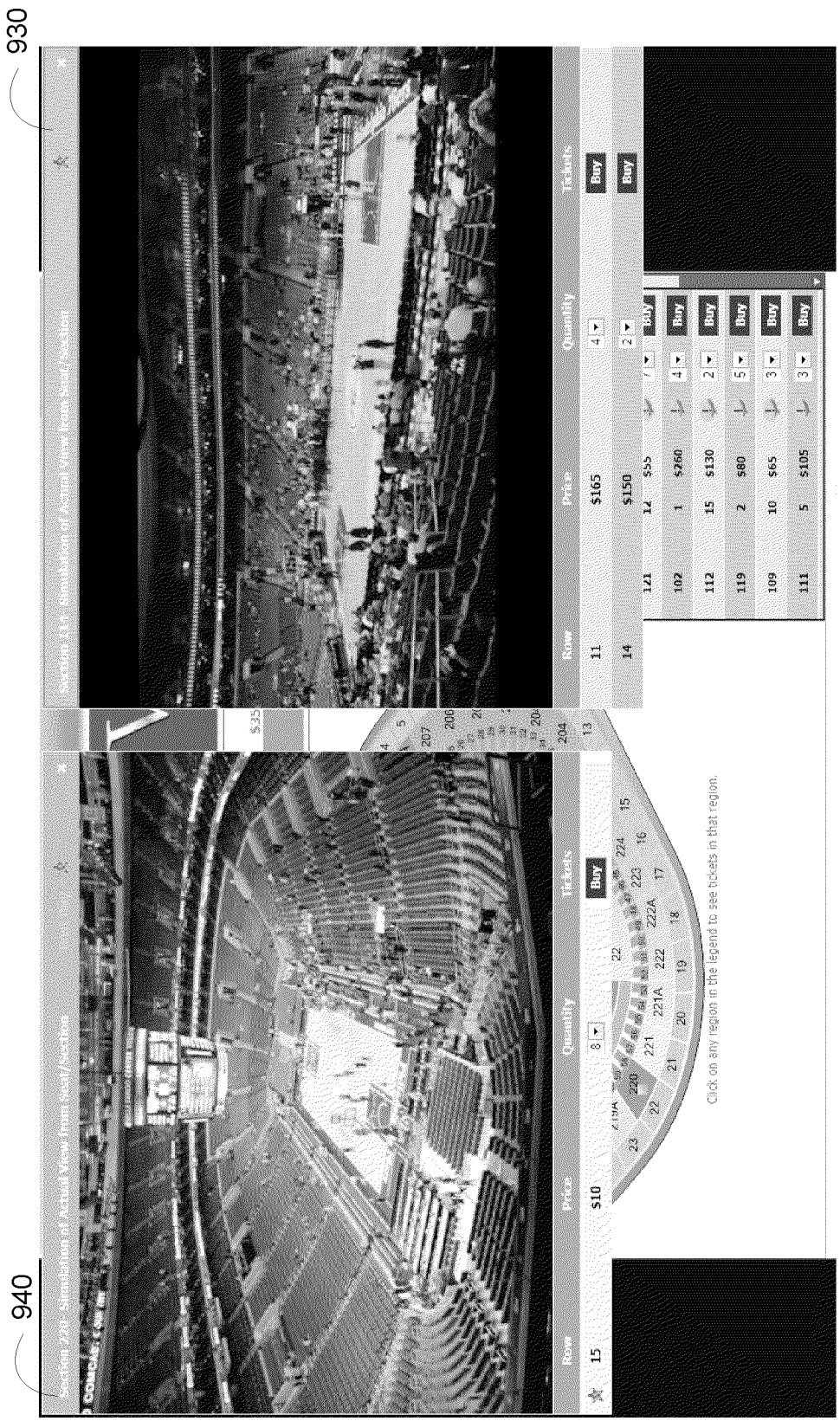

If a user clicks on a second section and/or seat while a venue viewer 930 for a first section and/or seat is still open, a second venue viewer 940 can load as illustrated in FIGS. 9B-C. The first venue viewer 930 can be resized so that both the first venue viewer 930 and the second venue viewer 940 fit on a user's screen. In this way, a user can compare two views. The resizing may be performed manually by the user, or automatically by the application. Note that the second venue viewer 940 may not always load when a user clicks on a second section and/or seat. The system can intelligently infer whether a user is trying to compare two views or whether the user is just attempting to view another section and/or seat. For example, some parameters the system can consider in determining whether to load the second venue viewer 940 include the proximity of the first section and/or seat to the second section and/or seat, a time that the first venue viewer 930 has been open, a number of available seats in the first section, a number of available seats in the second section, a pricing of seats in the first section, a pricing of seats in the second section, a purchase history of the user, a session history of the user, a number of times a section and/or seat has been chosen during the session, and the like.

In an embodiment, the system infers whether to display the second venue viewer 940 based on a calculated difference between the view that would be shown in venue viewer 940 and the view already shown in venue viewer 930. For example, if the two views are above a threshold of similarity, then the second viewer 940 is not displayed, but if the two views are sufficiently different (e.g., the second view is from a substantially different location, or is from a nearby location but has an obstructed view of the main area), then the second viewer 940 is displayed.

Figure 9D:
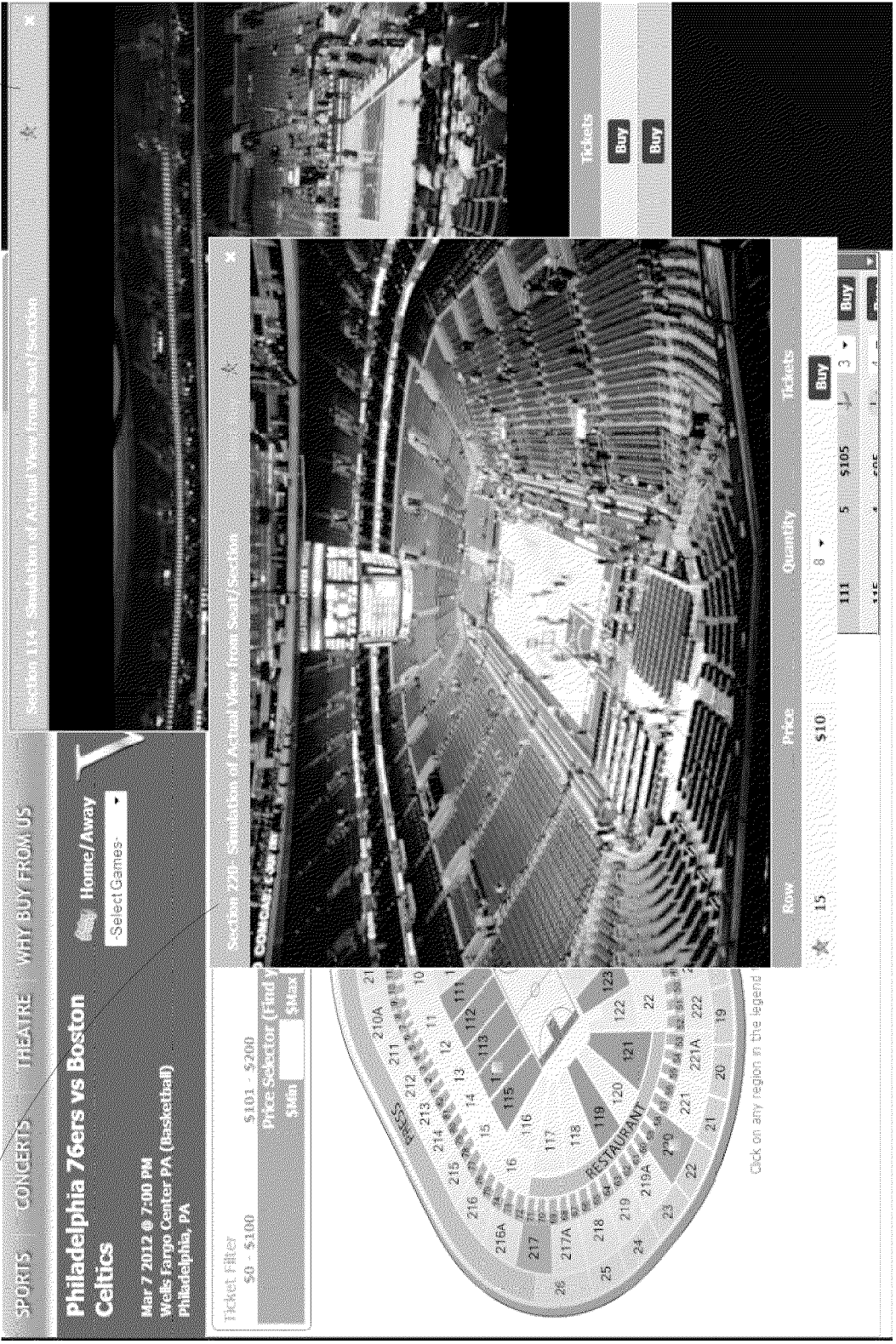

In an embodiment, like with a single venue viewer, a user can change the positions of the second venue viewer 940, as illustrated in FIG. 9D. In an embodiment, the first venue viewer 930 and/or the second venue viewer 940 can overlap and/or be resized. In an alternate embodiment, the venue viewers may not overlap, or may only be permitted to overlap partially. In an embodiment, the venue viewers are partially transparent, so that a venue viewer beneath another overlapping venue viewer may be partially seen (and, in an embodiment, the underlying display may be partially visible through the venue viewers). Note that while FIG. 9D illustrates two venue viewers 930 and 940, this is not meant to be limiting as the system supports the loading of any number of venue viewers.

Figure 10A:
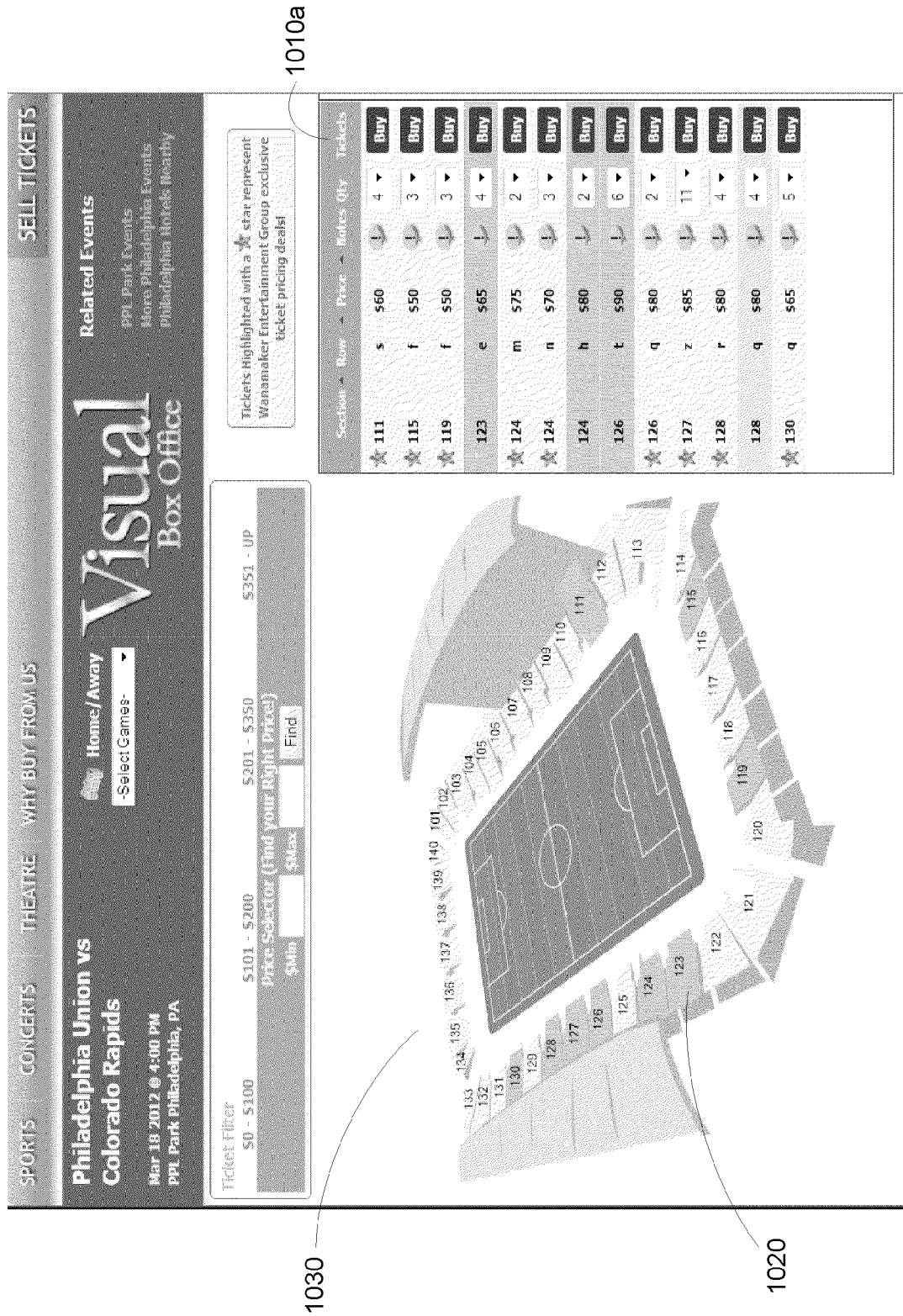

FIGS. 10A-D illustrate another example electronic ticketing agency website viewed through a browser. In an embodiment, once the website is initially loaded, frame 1010a can list sections in which seats are available in an order. For example, the sections can be arranged in alphabetical and/or numerical order, the sections can be arranged in alphabetical and/or numerical order by row, the sections can be arranged by prices for seats, the sections can be arranged by notes for each section, and/or the sections can be arranged by a number of seats available in the section. As illustrated in FIG. 10A, the sections in frame 1010a are arranged in numerical order. Those sections in which seats are available may be shaded appropriately in the displayed representation of the venue 1030. For example, section 123, in which at least one seat is available, in venue 1030 is represented by shaded block 1020.

Figure 10B:
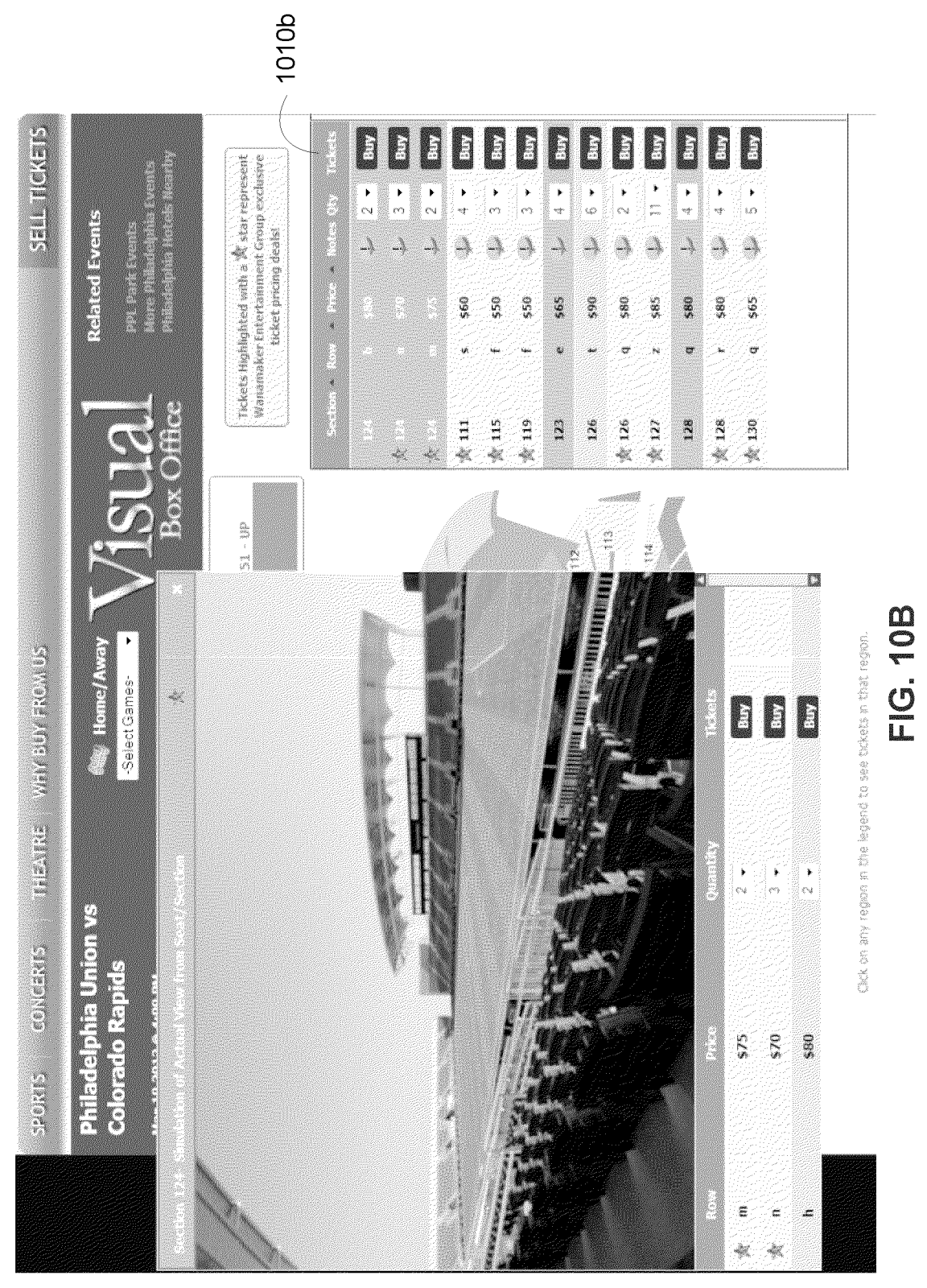
Figure 10C:
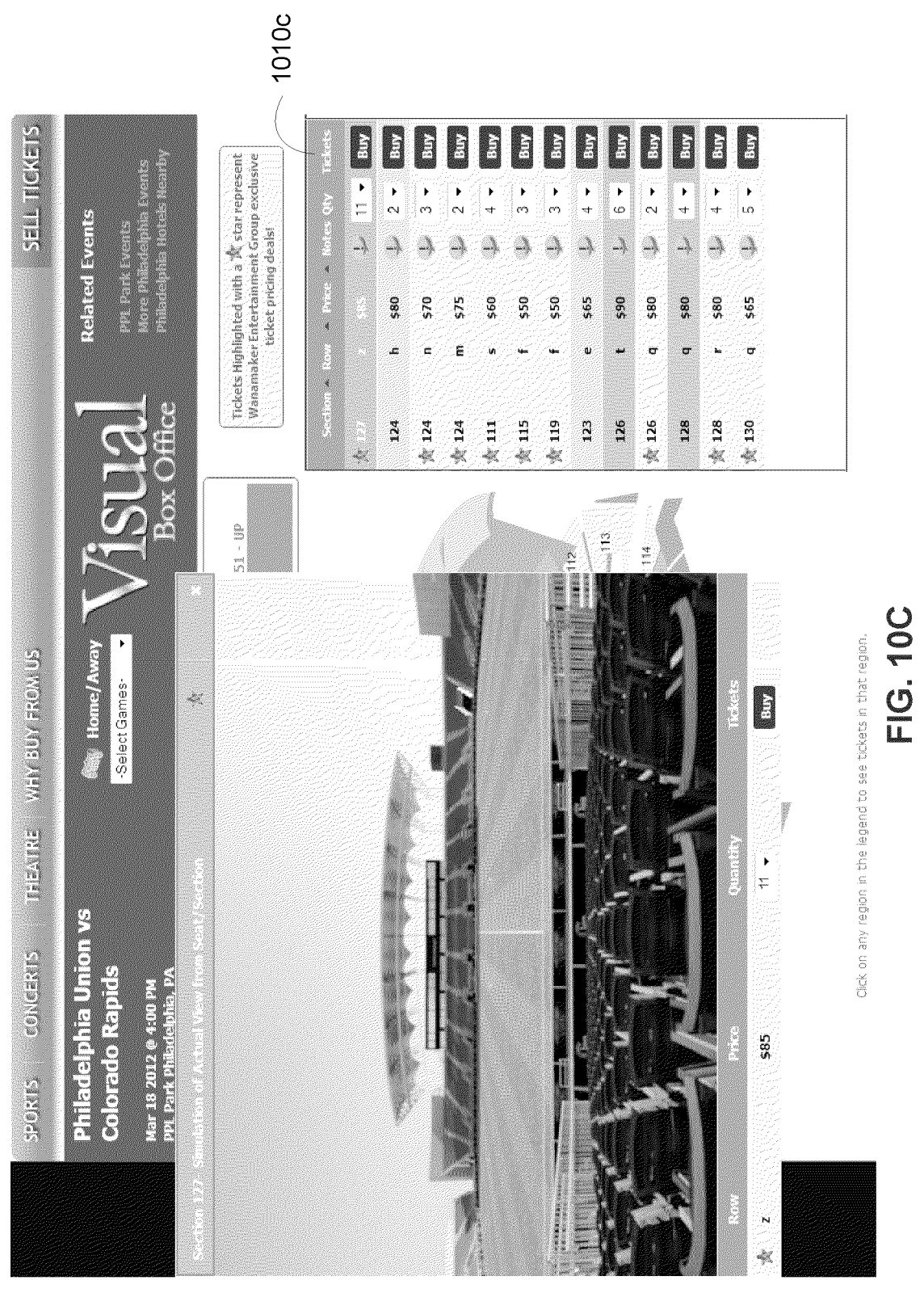
Figure 10D:
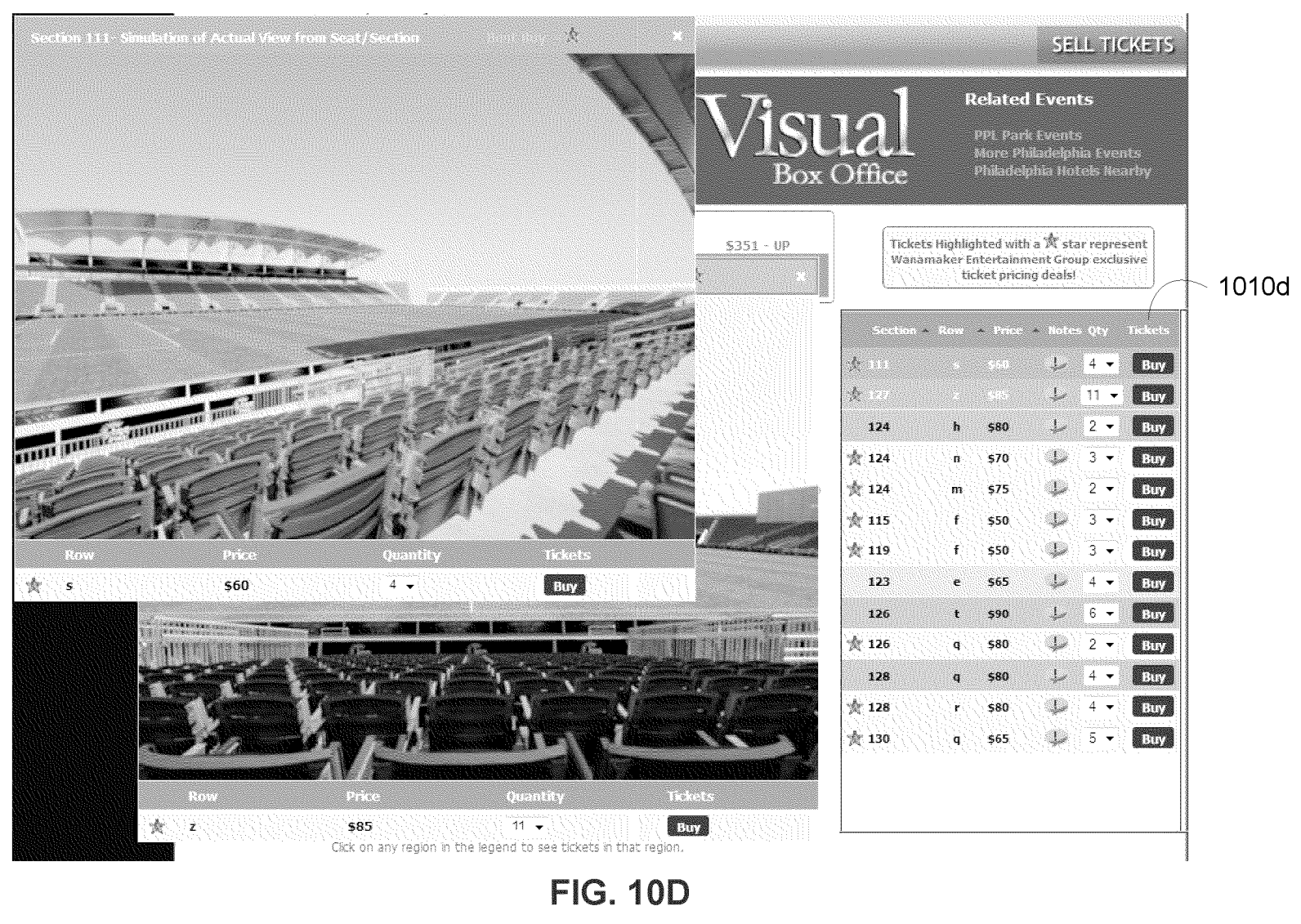

Once a user hovers over and/or selects a section, the order of the sections in frame 1010a can be adjusted. For example, as illustrated in FIG. 10B, section 124 was selected by the user. Accordingly, section 124 now appears at the top of frame 1010b. The rest of the sections follow in frame 1010b in numerical order. If another section is then chosen by the user, such as section 127 as illustrated in FIG. 10C, then section 127 will appear at the top of frame 1010c. Section 124 follows section 127 in frame 1010c, followed by the rest of the sections in numerical order. While FIG. 10C illustrates one venue viewer open at a time, FIG. 10D illustrates two venue viewers open at the same time. Likewise, frame 1010d can display the last section loaded at the top of the frame. In this way, a user can keep track of the previous sections that were visited during the current session.

Figure 11:
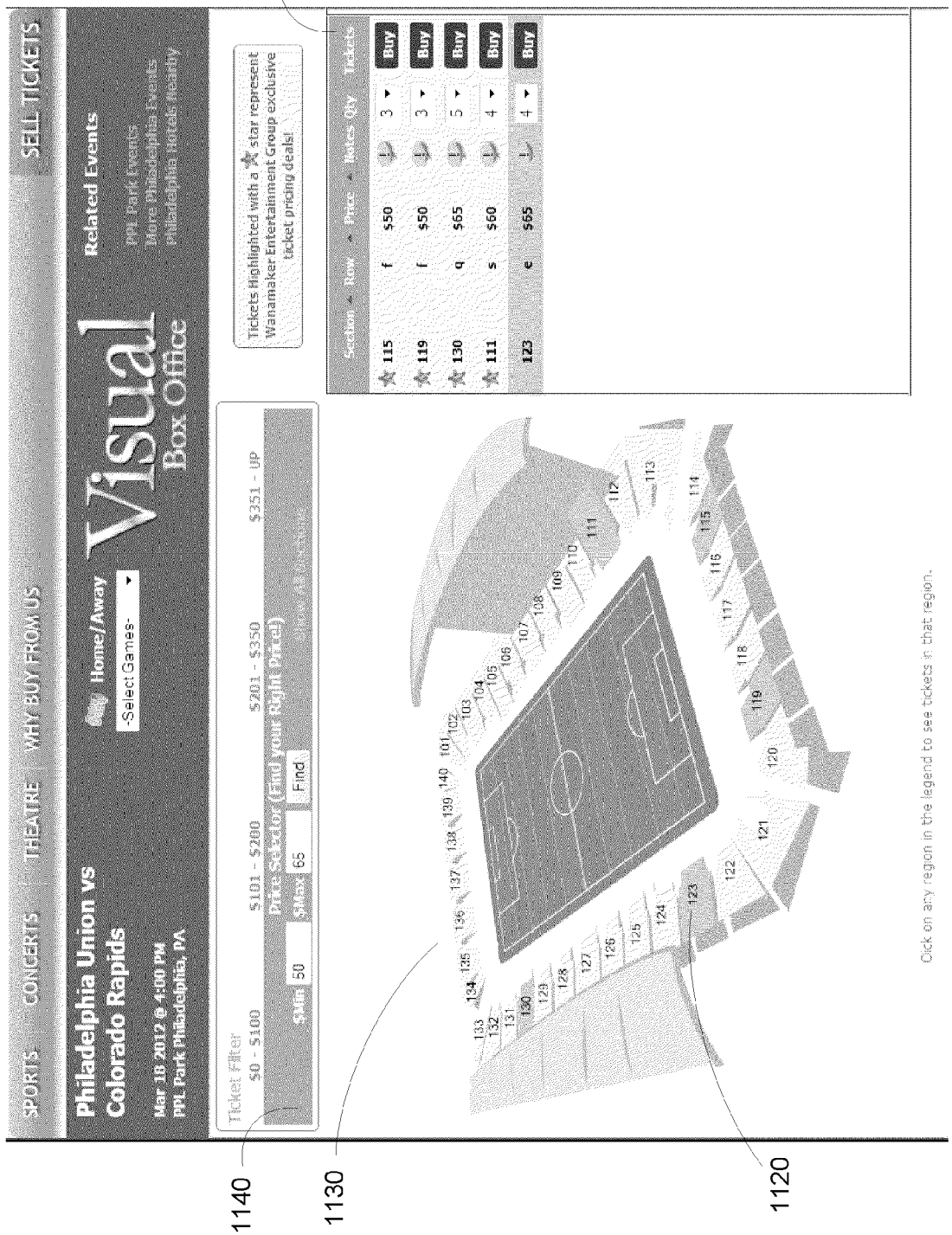
FIG. 11 illustrates another example electronic ticketing agency web site viewed through a browser.

FIG. 11 illustrates another example electronic ticketing agency website viewed through a browser. In an embodiment, the website includes a ticket filter 1140. In an embodiment, the ticket filter 1140 allows a user to enter a minimum and/or maximum price, and frame 1110 displays those sections in which seats are available that fall within the chosen price range. Those sections in which seats are available that fall within the chosen price range can also be shaded in the representation of the venue 1130, as described herein and with respect to FIG. 10A. For example, FIG. 11 illustrates a ticket filter 1140 that limits the price range of seats to between $50 and $65. Frame 1110 displays those sections in which seats within that price range are available, and section 123 is one of those sections. Accordingly, section 123 in venue 1130 is represented by a shaded block 1120. Other methods of indicating seats matching ticket filter 1140 may be used in various embodiments. For example, matching seats may be shown in a different font, in a larger or smaller font, in a different position on the screen, and the like. In an embodiment, matching seats are sorted above non-matching seats. In an embodiment, only matching seats are included in frame 1110.

Figure 12:
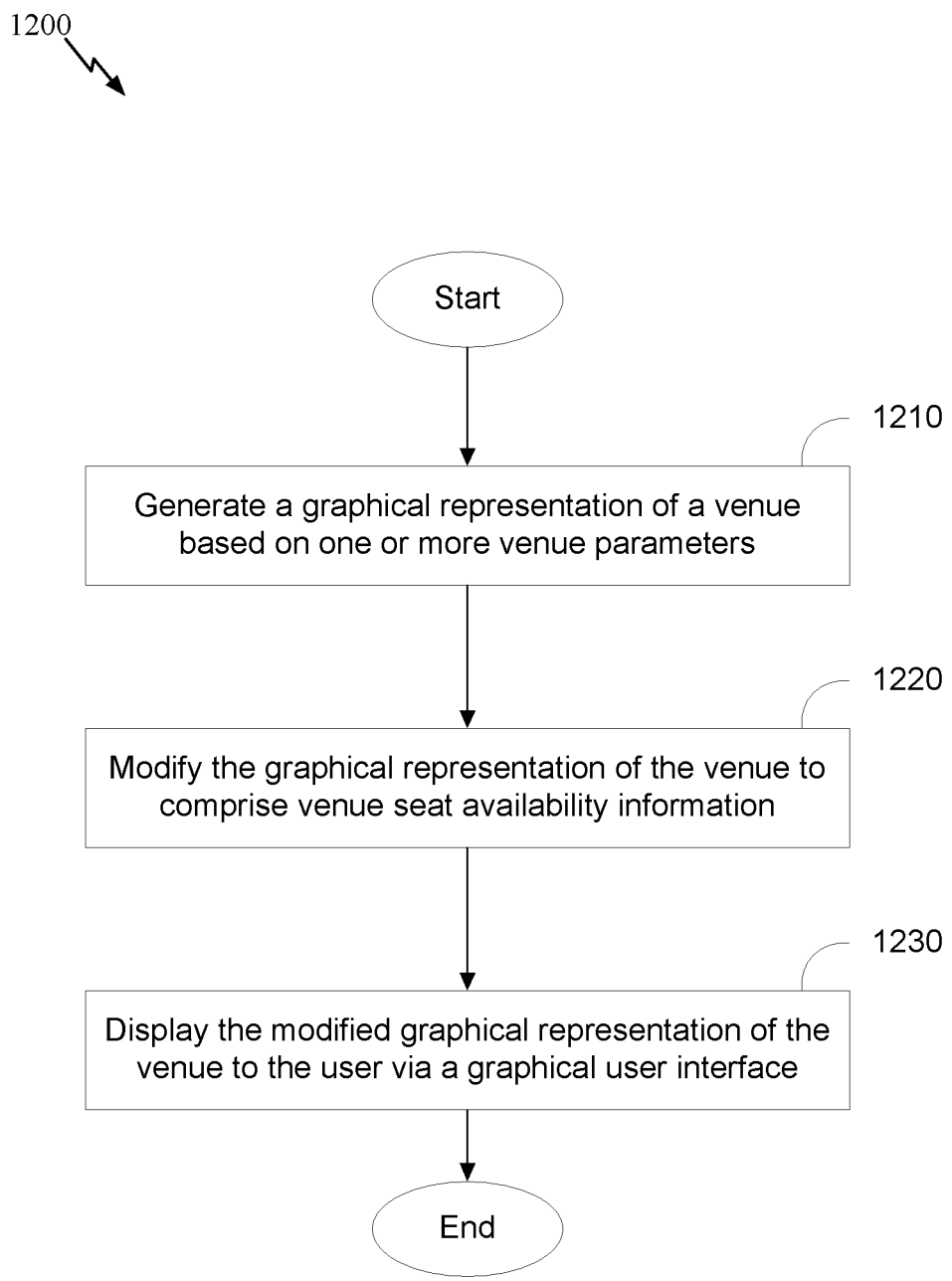
FIG. 12 illustrates an embodiment of a process for allowing a user to purchase a ticket.

FIG. 12 illustrates an embodiment of a process 1200 for allowing a user to purchase a ticket. In various embodiments, additional blocks may be performed, fewer blocks than shown may be performed, and/or the blocks may be performed in an order different than that shown. The process may be performed, for example, by server 120 of FIG. 1.

In an embodiment, the process 1200 begins at block 1210. At block 1210, the a graphical representation of a venue is generated based on one or more venue parameters. In an embodiment, a map generator as described herein may generate shapes or objects based on the venue parameters, where the shapes or objects together form a 2D and/or 3D graphical representation of the venue. After block 1210, the process 1200 proceeds to block 1220. At block 1220, the graphical representation of the venue is modified to comprise venue seat availability information. In an embodiment, a venue navigation processor modifies the graphical representation of the venue to include seat availability information, pricing information, and other venue information as described herein. After block 1220, the process 1200 proceeds to block 1230. At block 1230, the modified graphical representation of the venue is transmitted to the user via a graphical user interface to be displayed. In an embodiment, a client device, such as a computer or mobile phone, receives and displays the modified graphical representation of the venue.

Figure 13:
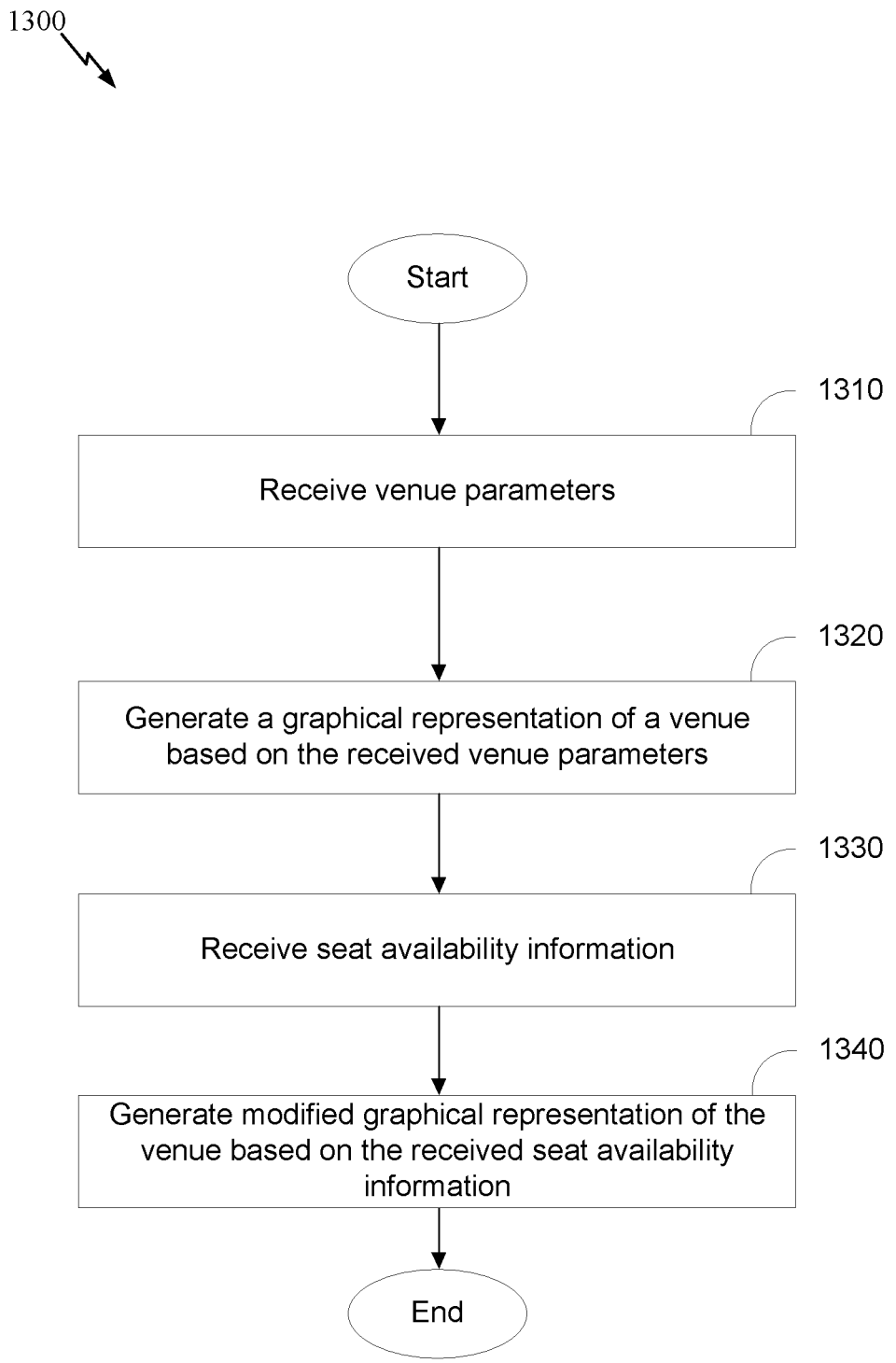
FIG. 13 illustrates an embodiment of a process for generating an interactive graphical representation of a venue.

FIG. 13 illustrates an embodiment of a process 1300 for generating an interactive graphical representation of a venue. In various embodiments, additional blocks may be performed, fewer blocks than shown may be performed, and/or the blocks may be performed in an order different than that shown. The process may be performed, for example, by server 120 of FIG. 1.

In an embodiment, the process 1300 begins at block 1310. At block 1310, venue parameters are received. In an embodiment, venue parameters can include dimensions of the venue. After block 1310, the process 1300 proceeds to block 1320. At block 1320, a graphical representation of a venue is generated based on the received venue parameters. In an embodiment, a map generator as described herein may generate shapes or objects based on the received venue parameters, where the shapes or objects together form a 2D and/or 3D graphical representation of the venue. After block 1320, the process 1300 proceeds to block 1330. At block 1330, seat availability information is received. After block 1330, the process 1300 proceeds to block 1340. At block 1340, the graphical representation of the venue is modified based on the received seat availability information. In an embodiment, a venue navigation processor modifies the graphical representation of the venue based on the received seat availability information. The modified graphical representation of the venue can include seat availability, pricing information, and other venue information as described herein.

Figure 14:
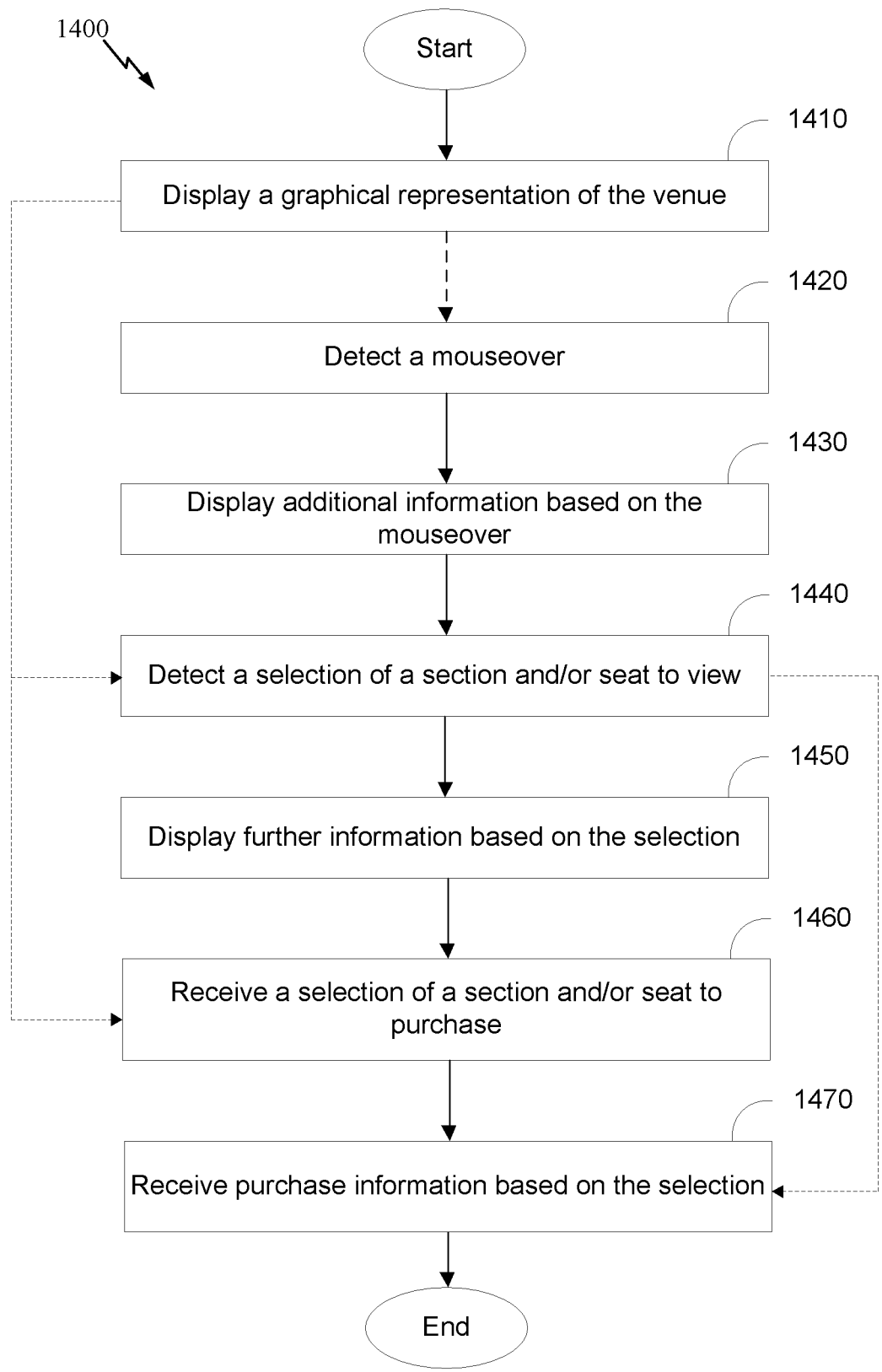
FIG. 14 illustrates an embodiment of a process for allowing a user to purchase a ticket by using an interactive graphical representation of a venue.

FIG. 14 illustrates an embodiment of a process 1400 for allowing a user to purchase a ticket by using an interactive graphical representation of a venue. In various embodiments, additional blocks may be performed, fewer blocks than shown may be performed, and/or the blocks may be performed in an order different than that shown. The process may be performed, for example, by client device 110 of FIG. 1.

In an embodiment, the process 1400 begins at block 1410. At block 1410, the graphical representation of the venue is displayed. In some embodiments, after block 1410, the process 1400 proceeds to block 1420. In other embodiments, after block 1410, the process 1400 proceeds to blocks 1440 and/or 1460.

At block 1420, a mouseover or other user input is detected. In an embodiment, the mouseover may be the moving of a cursor over a portion of the graphical representation of the venue. In other embodiments, the process 1400 at block 1420 can detect a voice command or other aural input. In still other embodiments, the process 1400 at block 1420 can detect touch input, brain wave activity, and/or orientation of a client device. After block 1420, the process 1400 proceeds to block 1430. At block 1430, additional information is displayed based on the mouseover. In an embodiment, the additional information can include seat availability and/or pricing information for a particular section of the venue. After block 1430, the process 1400 proceeds to block 1440. At block 1440, a selection of a section and/or seat to view is detected. In an embodiment, a selection is represented by the click of a mouse. In other embodiments, the process 1400 at block 1440 detects a selection via a voice command or other input. In some embodiments, after block 1440, the process 1400 proceeds to block 1450. In other embodiments, after block 1440, the process 1400 proceeds to block 1470.

At block 1450, further information is displayed based on the selection. In an embodiment, the further information includes available seats and pricing information, a 2D and/or 3D navigable representation of the venue, a purchase history of the user, a seat purchased by another user, a location of restrooms in the venue, a location of handicap seating in the venue, a location of concession stands in the venue, and the like. After block 1450, the process 1400 proceeds to block 1460. At block 1460, a selection of a section and/or seat to purchase is received. After block 1460, the process 1400 proceeds to block 1470. At block 1470, purchase information based on the selection is received. After block 1470, the process 1400 proceeds to block 1480. At block 1480, the purchase information is transmitted, for example to server 120.

Figure 15A:
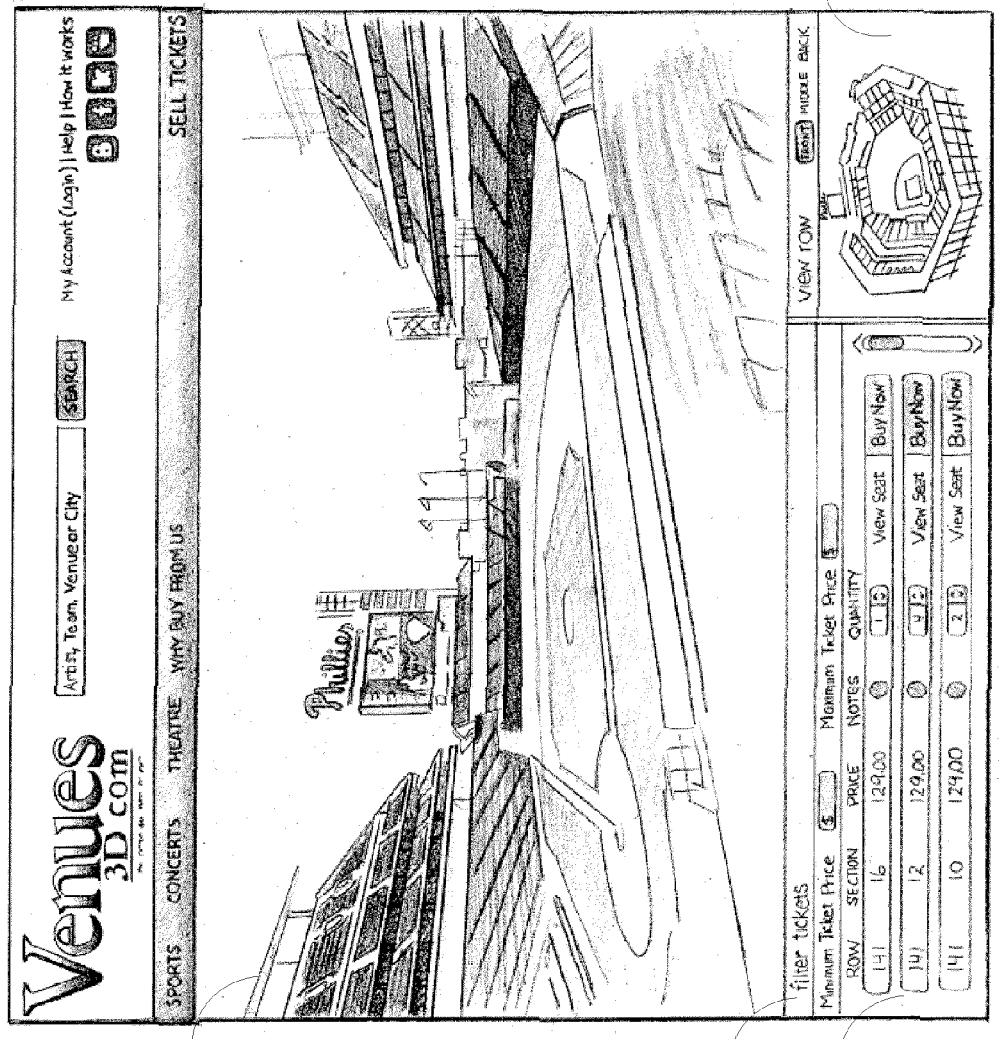
FIGS. 15A-D illustrate another more detailed view of a venue viewer.
Figure 15B:
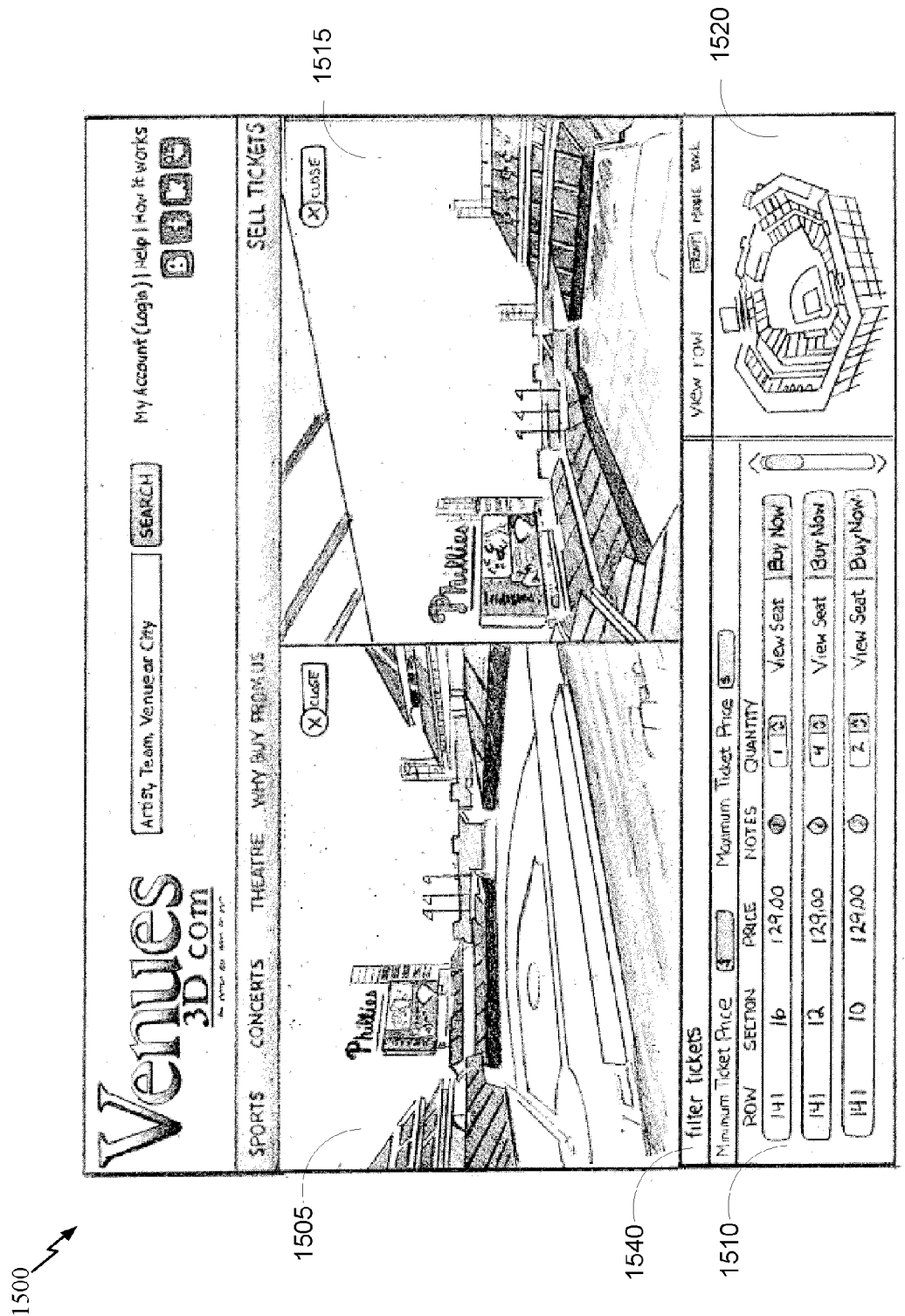

FIGS. 15A-D illustrate another more detailed view of a venue viewer 1500. The venue viewer 1500 may be shown, for example, in FIGS. 6A-B with venue viewers 610a and/or 610b. As illustrated in FIG. 15A, the venue viewer 1500 includes a first frame 1505, a ticket frame 1510, a venue graphic 1520, and/or a ticket filter 1540. In some embodiments, not shown, the first frame 1505 or an area of the venue viewer 1500 near the first frame 1505 may include controls, such as controls 710 as described herein with respect to FIGS. 7A-D. In an embodiment, the first frame 1505 is similar to the frame 705 as described herein with respect to FIGS. 7A-D. The first frame 1505 may allow a user to zoom in or out, rotate the default view in all directions (e.g., in an x, y, and/or z direction), and/or tilt the default view by touching, clicking, dragging, and/or hovering over the first frame 1505.

In an embodiment, as a user interacts with the first frame 1505, additional information may be provided to the user. For example, if a user hovers over and/or selects another section that can be seen within the first frame 1505, a pop-up window (e.g., that appears within the application window itself or in a different application window), an alternative to a pop-up window as described herein, or a window that takes up the entire or nearly the entire screen may appear and contain information for the user. The information may include a description of the selected and/or hovered over section (e.g., what kind of view would be expected, how to reach the section, historical information about the section, amenities associated with the section, attractions, restrooms, concession stands, and/or other features of the venue located near the section, or the like). The information may be displayed as text, graphics, and/or spoken by a live and/or automated voice.

In some embodiments, an avatar (e.g., a graphical representation of a person or entity) may appear to provide information about the selected and/or hovered over section and/or to facilitate the purchase of one or more seats in the section. For example, a user may be able to ask questions about the section verbally and/or by entering text. Using speech recognition technology, the server 120 and/or the client device 110 may parse the words spoken by the user to determine what is being asked. The server 120 and/or the client device 110 may then generate one or more answers, one or more questions, and/or advice based on the parsed spoken words. The answers, questions, and/or advice may be displayed via text in the pop-up windows as described above and/or may be spoken by the avatar. The user may further interact with the avatar, by answering questions asked by the avatar, asking further questions based on answers, questions, and/or advice provided by the avatar, or the like. Some questions may include "how much do these seats cost?," "where is the closest concession stand?," and the like. In this way, the user may engage in a conversation with the avatar regarding the selected and/or hovered over section, the venue itself, and related information.

In another example, a user may be able to provide instructions regarding which seat(s) a user wishes to purchase and/or how the purchase will be made. Using speech recognition technology as described herein, the server 120 and/or the client device 110 may parse the words spoken by the user to identify the instructions. In some embodiments, the instructions may be displayed via text and/or spoken by the avatar. In further embodiments, the instructions may be carried out. As an example, the user may indicate that he or she wishes to purchase tickets in a particular section, in a particular row, and/or at a particular seat or set of seats. The user may further indicate the payment method and may disclose verbally the payment information (e.g., credit card number, billing address, etc.).

In some embodiments, the user may be able to access services while interacting with the first frame 1505. For example, if a user hovers over and/or selects a current section or another section that can be seen within the first frame 1505, a pop-up window (e.g., that appears within the application window itself or in a different application window), an alternative to a pop-up window as described herein, or a window that takes up the entire or nearly the entire screen may appear containing information related to amenities and/or services available. The user may be able to select one or more amenities and/or services to view additional details about the amenity and/or service. Amenities and/or services may include food stands, restaurants, stores, catering, a business center, hotels, a concierge, or the like. The user, upon selecting one or more amenities and/or services, may be able to make reservations, make a preorder, purchase items, or the like. In some embodiments, the types and/or number of services available and displayed may vary depending on which section in the venue is selected.

In an embodiment, the ticket frame 1510 may display tickets available in a chosen section and/or row. The ticket frame 1510 may display information regarding the available seats, including location and price. A user may be able to select a number of seats to purchase and finalize the order by purchasing the seat(s). In this way, a user may be able to view and select a seat or seats for purchase without exiting the venue viewer 610a and/or 610b.

In some embodiments, the ticket frame 1510 may allow a user to select an available seat or set of seats. If the user selects a seat or set of seats, the first frame 1505 may transition to display a view from the newly selected seat and/or set of seats. For example, if a user selects a first seat, the view in the first frame 1505 may transition to display the view from the selected first seat. If the user then selects a second seat, the view in the first frame 1505 may or may not transition to display the view from the selected second seat. In some aspects, the first frame 1505 may transition to display the view from the selected second seat if the view from the second seat is noticeably different from the view from the first seat. The view may be noticeably different if an angle to view the field, court, ice, and/or stage is different, one view includes an obstruction and the other doesn't, a price for each seat is different, or the like. Likewise, the first frame 1505 may not transition to display the view from the selected second seat if the view from the second seat is substantially similar to the view from the first seat. In this way, the first frame 1505 may transition to a new view even if the two seats are adjacent to each other, but may not transition to a new view even if the two seats are far apart from each other.

In an embodiment, the venue graphic 1520 is similar to the venue graphic 720 as described herein with respect to FIGS. 7A-D. The venue graphic 1520 may indicate a current section being displayed in the first frame 1505. The venue graphic 1520 may also allow a user to navigate the venue and cause the first frame 1505 to transition to a new view. For example, a user may touch, click, press, hover over, and/or drag the venue graphic 1520 to alter an orientation (e.g., in an x, y, and/or z direction) and/or a zoom level of the venue graphic 1520. A user may select any seat, row, and/or section within the venue graphic 1520, and the first frame 1505 may then transition to a view from the chosen seat, row, and/or section in response.

In an embodiment, the ticket filter 1540 is similar to the ticket filter 1140 as described herein with respect to FIG. 11. As filter criteria (e.g., rules) are entered, the display of available tickets in the ticket frame 1510 may change to display available tickets that satisfy the filter criteria.

In an embodiment, a user may be able to view one or more frames (with a view from a section) at a same time. As illustrated in FIG. 11B, the venue viewer 1500 includes the first frame 1505 and a second frame 1515. The second frame 1515 may appear when a user clicks, hovers over, or otherwise selects a section in the first frame 1515. The second frame 1515 may also appear when a user clicks, hovers over, or otherwise selects another section in the venue graphic 1520. The second frame 1515 may also appear when a user selects to view a seat or section of seats in the ticket frame 1510.

Like the first frame 1505, the second frame 1515 may be similar to the frame 705 as described herein with respect to FIGS. 7A-D. The second frame 1515 may allow a user to zoom in or out, rotate the default view in all directions (e.g., in an x, y, and/or z direction), and/or tilt the default view by touching, clicking, dragging, and/or hovering over the first frame 1505. In an embodiment, the second frame 1515 may also provide additional information to the user as the user interacts with it and allow the user to access services as described herein.

In an embodiment, the first frame 1505 and the second frame 1515 may be movable within the venue viewer 1500. For example, a user may select the first frame 1505 and drag it (or provide voice commands to move it) to another location within the venue viewer 1500. The second frame 1515 may be movable in the same manner. The first frame 1505 may overlap the second frame 1515 and vice-versa.

In an embodiment, a user may select a seat or a set of seats in the ticket frame 1510, which may cause a view in the first frame 1505, the second frame 1515, or both frames to transition to a view from the newly selected seat or set of seats. The frame 1505 or 1515 that transitions may be based on the last frame 1505 or 1515 that was active, a user selection of which frame 1505 or 1515 to change, or the like.

Figure 15C:
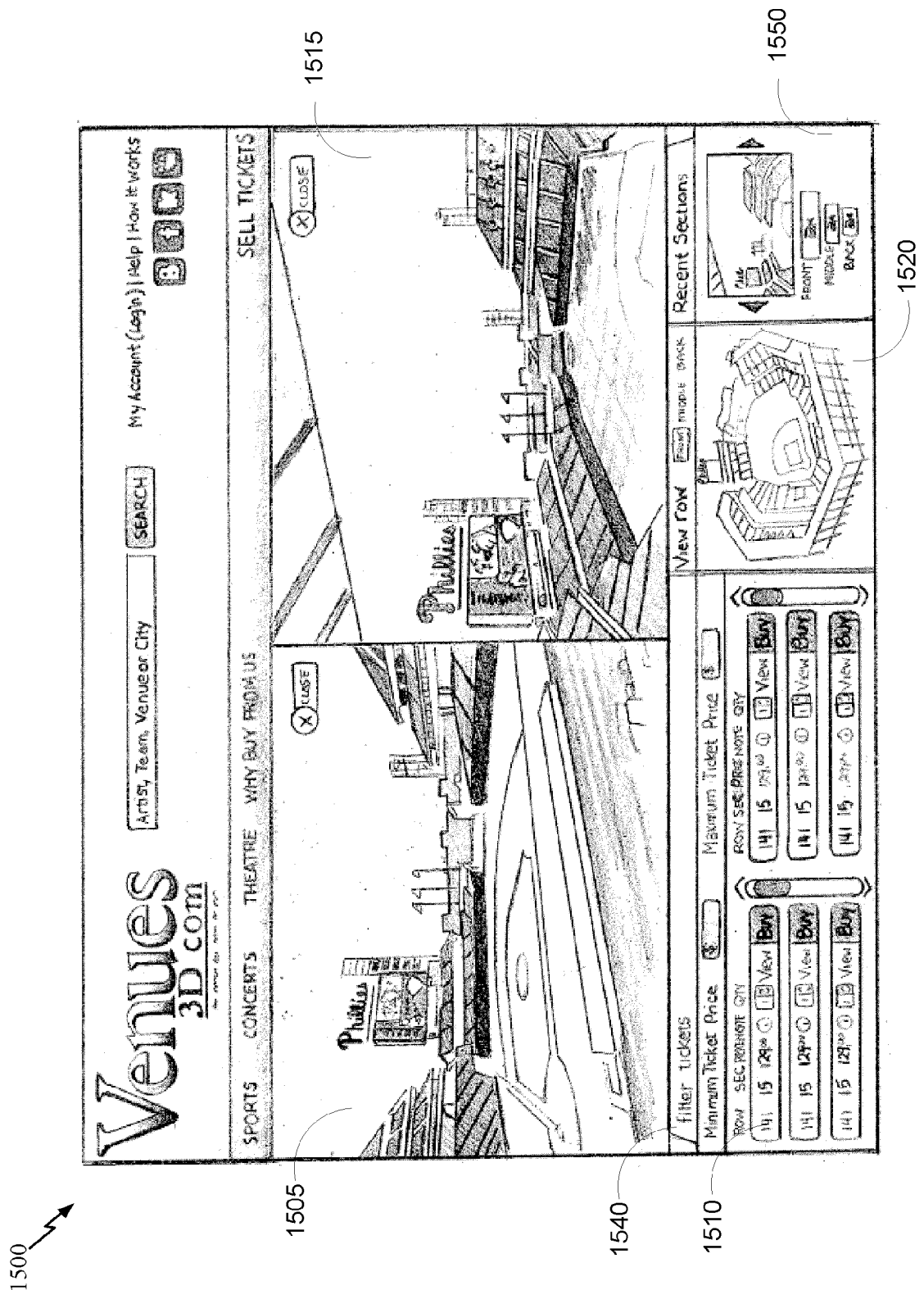

In an embodiment, a user may be able to browse through seats, rows, and/or sections previously viewed (e.g., viewed during a current session). As illustrated in FIG. 15C, the venue viewer 1500 may include a recent section frame 1550. The recent section frame 1550 may display a view from one or more recently viewed seats, rows, and/or sections. The display may be fully interactive in a way as described herein with respect to the first frame 1505 and the second frame 1515. For example, a user may be able to zoom in or out, rotate the default view in all directions (e.g., in an x, y, and/or z direction), and/or tilt the default view by touching, clicking, dragging, and/or hovering over the displayed seat, row, and/or section in the recent section frame 1550. In other embodiments, the user may select from a "front" view, a "middle" view, and/or a "back" view to adjust the view displayed in the recent section frame 1550 (e.g., a "front" view being a view while sitting in the front of a section, a "middle" view being a view while sitting in the middle of a section, and a "back" view being a view while sitting in the back of the section).

In an embodiment, a user may scroll through previously viewed seats, rows, and/or sections by dragging the display of the view in the recent section frame 1550 to the left or the right. In other embodiments, a user may scroll through previously viewed seats, rows, and/or sections by selected left or right arrows.

Figure 15D:
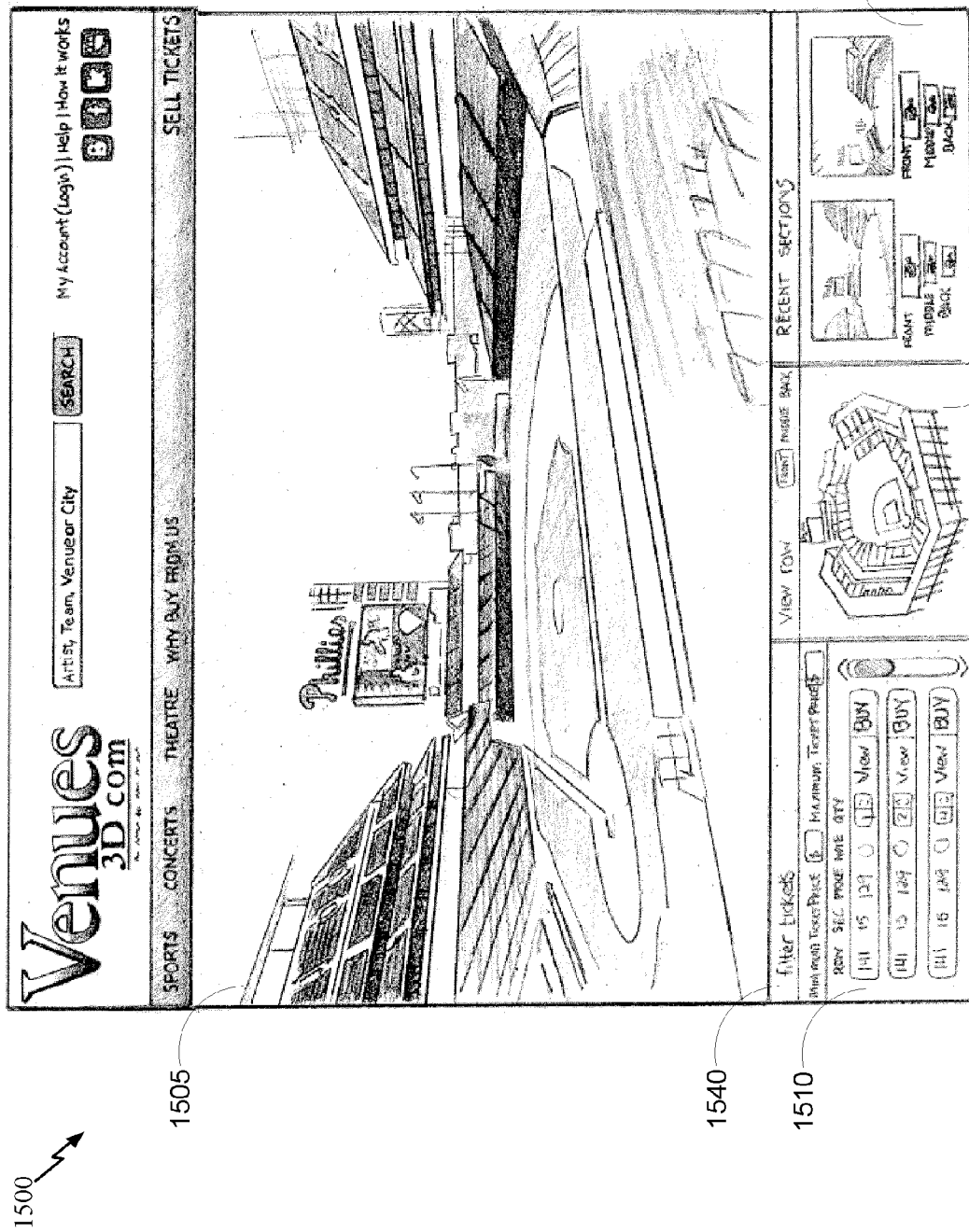

In some embodiments, a user may be able to view one or more recently viewed seats, rows, and/or sections at a same time. As illustrated in FIG. 15D, the venue viewer 1500 may include a recent section frame 1560. The recent section frame 1560 may be similar to the recent section frame 1550. However, the recent section frame 1560 may display two separate views from seats, rows, and/or sections that were recently viewed. The same functionality may apply as described herein with respect to the recent section frame 1550.

Figure 16A:
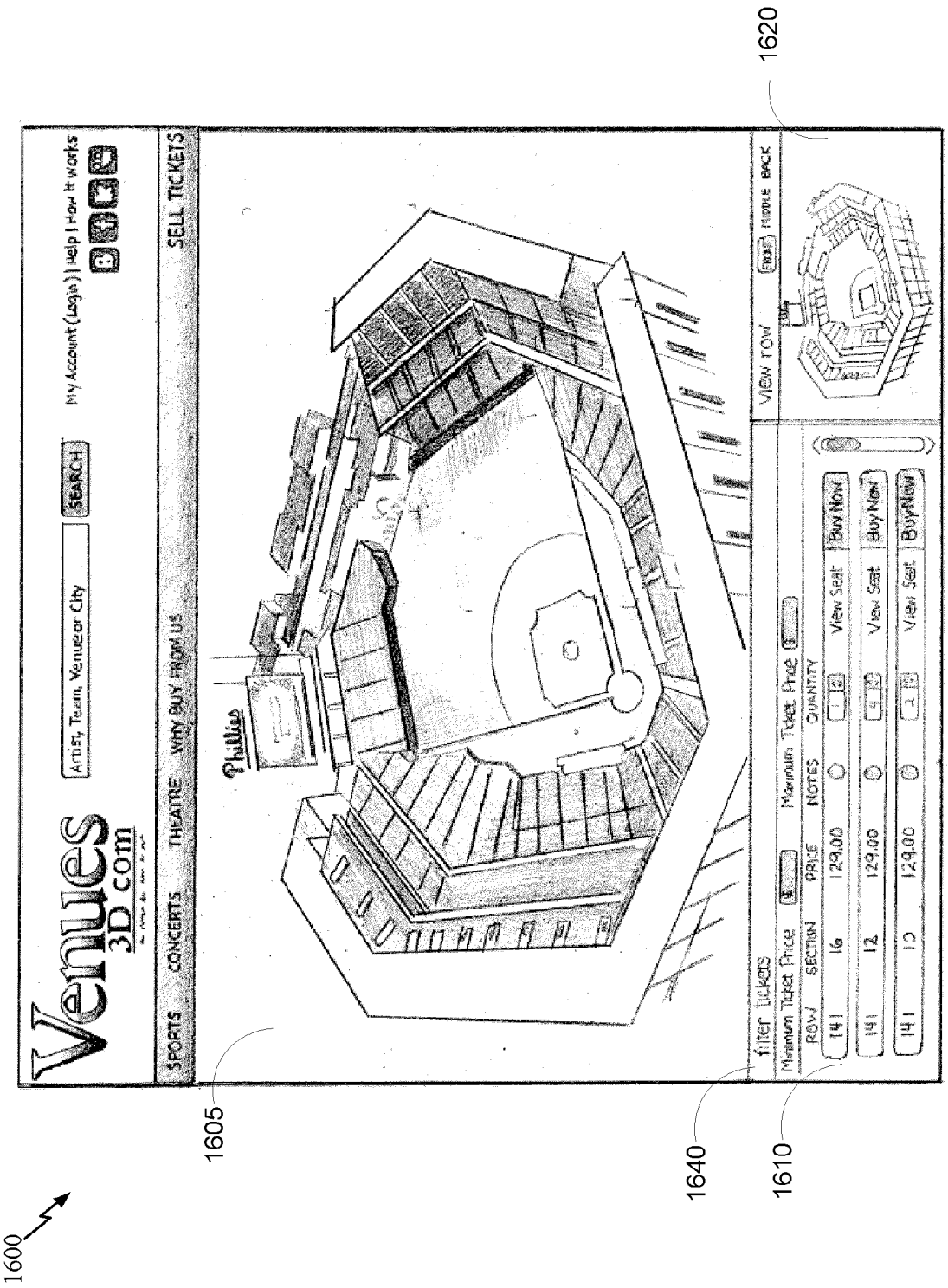
FIGS. 16A-B illustrate another more detailed view of a venue viewer.
Figure 16B:
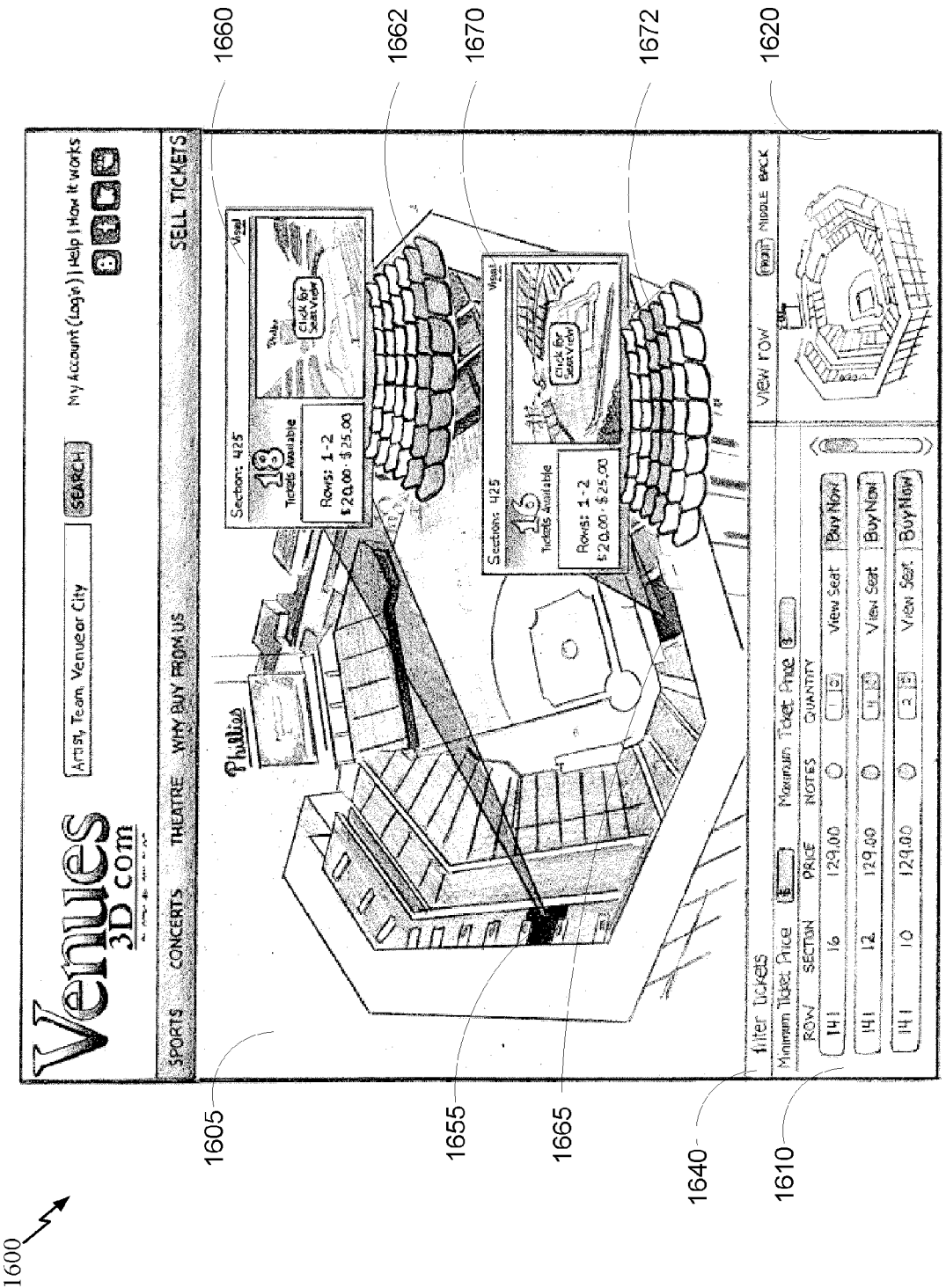

FIGS. 16A-B illustrate another more detailed view of a venue viewer 1600. The venue viewer 1600 may be shown, for example, in FIGS. 6A-B with venue viewers 610a and/or 610b. As illustrated in FIG. 16A, the venue viewer 1600 includes a first frame 1605, a ticket frame 1610, a venue graphic 1620, and/or a ticket filter 1640. In some embodiments, the first frame 1605 may be similar to the first frame 1505 of FIGS. 15A-D, the ticket frame 1610 may be similar to the ticket frame 1510 of FIGS. 15A-D, the venue graphic 1620 may be similar to the venue graphic 1520 of FIGS. 15A-D, and the ticket filter 1640 may be similar to the ticket filter 1540 of FIGS. 15A-D.

In an embodiment, a user may be able to zoom out in the first frame 1605 to view buildings and/or structures adjacent to the venue being viewed. For example, the user may be able to zoom out and see a parking structure, restaurants, hotels, and the like that are geographically situated near the venue being viewed. These buildings and/or structures may be represented graphically in 2D and/or 3D. In some embodiments, some or all of the buildings and/or structures may be selectable. A viewer may select one of these buildings and/or structures to make reservations, make preorders, purchase items, or the like. For example, a user may be able to view available parking spots in a parking structure and reserve a parking spot for use when attending the venue. Likewise, a user may be able to view available rooms in a nearby hotel and make a reservation. A user interface similar to that described herein may be used to, for example, reserve hotel rooms, or another interface may be used that can-pop up in a separate window, that uses a same window, etc.

In an embodiment, a user may be able to view a zoomed out portion of a section within the venue viewer 1600. As illustrated in FIG. 16B, the venue viewer 1600 may include the first frame 1605 in which a user may select a section. For example, if a user clicks and/or hovers over section 1655, zoomed out portion 1660 may appear. The zoomed out portion 1660 may appear as a pop-up window, an alternative to a pop-up window, or fill the entire or nearly the entire screen of the venue viewer 1600. The zoomed out portion 1660 may include information about seats that are available in the section 1655 (e.g., which rows include seats that are available, which seats are available, a number of seats available, and/or a price for available seats) as well as an image representative of a view from the section 1655 and a graphical representation 1662 of at least a portion of one row.

In some embodiments, if the image representative of the view from the section 1655 is selected (e.g., via a click, a hover over, etc.), then the first frame 1605 may transition to a view from the section 1655. In addition, as a user clicks and/or hovers over the graphical representation 1662 of at least a portion of one row, the image representative of the view may change to correspond with the row and/or seat being clicked and/or hovered over.

In some embodiments, if a user selects a seat or set of seats in the graphical representation 1662, additional information may be provided, such as price information and/or other notes. In addition, the user may be able to purchase the selected seat or set of seats.

Seats and/or rows that include available seats may be shaded a different color in the graphical representation 1662 than seats and/or rows that are occupied or otherwise already purchased.

In an embodiment, if a user clicks and/or hovers over a second section, like section 1665, then a second zoomed out portion 1670 along with a graphical representation 1672 may be appear. The second zoomed out portion 1670 may be similar to the zoomed out portion 1660 as described herein. In addition, the graphical representation 1672 may be similar to the graphical representation 1662 as described herein. In this way, a user may be able to compare two or more sections.

Note that while the use of a mouse or other pointing device is described herein, a user can navigate through the venue and purchase tickets for a seat without using a mouse or pointing device. For example, the user can use a touch screen device and/or provide voice commands to the client device 110. The voice commands can include directions to view certain sections and/or seats, find seats in a certain price range, compare one or more sections and/or seats (e.g., compare views of one or more sections and/or seats), select certain seats and/or sections, purchase tickets for certain seats and/or sections, and the like. Likewise, the venue viewer and/or the website can provide visual and/or aural feedback. For example, an avatar can speak and/or display information related to a section and/or seat of a venue. In this way, a user unfamiliar with a venue may be able to learn about the views and other amenities associated with a given section and/or seat in order to make an informed purchase.

Each of the processes, methods, and algorithms described in the preceding sections can be embodied in, and fully or partially automated by, code modules executed by one or more computers or computer processors. The code modules can be stored on any type of non-transitory computer-readable storage medium or computer storage device, such as hard drives, solid state memory, optical disc, and/or the like. The systems and modules can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). The processes and algorithms can be implemented partially or wholly in application-specific circuitry. The results of the disclosed processes and process steps can be stored, persistently or otherwise, in any type of non-transitory computer storage such as, e.g., volatile or non-volatile storage.

The various features and processes described above can be used independently of one another, or can be combined in various ways. All possible combinations and subcombinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to, or removed from the disclosed example embodiments. The example systems and components described herein can be configured differently than described. For example, elements can be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein can be embodied in a variety of other forms; furthermore, various omissions, substitutions and changes in the form of the methods and systems described herein can be made without departing from the spirit of the inventions disclosed herein. The accompanying claims and their equivalents are intended to cover such forms or modifications as would fall within the scope and spirit of certain of the inventions disclosed herein.

What is claimed is:

1. A system for allowing a user to purchase a ticket, the system comprising:
   a data store;
   a venue navigation processor; and
   one or more program instructions stored in the data store, which, when executed by the venue navigation processor, cause the venue navigation processor to:
      construct first data configured to cause an application executing on a computing device to generate a three-dimensional graphical representation of a venue in a background of a first view, wherein the three-dimensional graphical representation of the venue comprises a three-dimensional graphical representation of a plurality of sections of seats;
      receive, from the application executing on the computing device, a selection of a first section in the plurality of sections, wherein a list of sections in the plurality of sections selected by the user are stored in the data store, and wherein the first section is a last section entered in the list;
      construct, in connection with receiving the selection, second data configured to cause the application executing on the computing device to generate a graphical representation of the selected first section in the first view;
      wherein the graphical representation of the selected first section comprises an image and a three-dimensional graphical representation of a plurality of rows of seats in the selected first section;
      wherein the image is representative of a view from a row in the plurality of rows selected by the user via the application executing on the computing device; and
      wherein the graphical representation of the selected first section is displayed in a foreground of the first view and overlays a portion of the three-dimensional graphical representation of the venue other than a portion corresponding to the selected first section.

2. The system of claim 1, wherein the one or more program instructions stored in the data store, when executed by the venue navigation processor, further cause the venue navigation processor to:
   receive, from the application executing on the computing device, a selection of a second section in the plurality of sections; and
   construct, in connection with receiving the selection of the second section, third data configured cause the application executing on the computing device to generate a graphical representation of the selected second section in the first view;
   wherein the graphical representation of the selected first section comprises a second image and a graphical representation of a plurality of rows in the selected second section;
   wherein the second image is representative of a view from a row in the plurality of rows in the selected second section selected by the user via the application executing on the computing device;
   wherein the graphical representation of the selected second section is displayed in the foreground of the first view; and
   wherein the graphical representation of the selected first section and the graphical representation of the selected second section are non-overlapping.

3. The system of claim 2, wherein the graphical representation of the selected first section and the graphical representation of the selected second section are configured to move within the first view when selected by the user via the application executing on the computing device.

4. The system of claim 1, wherein the one or more program instructions stored in the data store, when executed by the venue navigation processor, further cause the venue navigation processor to generate at least one of an audio signal or a dialog box comprising information associated with the selected first section.

5. The system of claim 1, wherein the graphical representation of the selected first section comprises at least one of a number of tickets available in the selected first section or a price range of tickets available in the selected first section.

6. The system of claim 1, wherein a seat in the plurality of rows is shaded a first color to indicate that the seat is available, and wherein a second seat in the plurality of rows is shaded a second color to indicate that the second seat is unavailable.

7. The system of claim 1, wherein the selection of the section comprises at least one of hovering an icon controlled by an input device over the section or clicking the input device when the icon is placed over the section.

8. The system of claim 1, wherein the one or more program instructions stored in the data store, when executed by the venue navigation processor, further cause the venue navigation processor to construct third data configured to cause the application executing on the computing device to generate and display an icon associated with a second section in the plurality of sections, wherein the icon represents at least one of a location in the venue where another user has purchased a ticket, a location in the venue where the user has purchased a ticket at a previous time, a rating given to the second section by other users, a location in the venue where handicap seats are available, or a location in the venue where restrooms are available.

9. A computer-implemented method of allowing a user to purchase a ticket, the computer-implemented method comprising:
   as implemented by one or more computer systems comprising computer hardware and memory, the one or more computer systems configured with specific executable instructions,
      constructing first data configured to cause an application executing on a computing device to generate an interactive graphical representation of a venue in a background of a first view, wherein the venue comprises a plurality of sections of seats;
      receiving, from the application executing on the computing device, a selection of a first section in the plurality of sections, wherein a list of sections in the plurality of sections selected by the user are stored in a data store, and wherein the first section is a last section entered in the list;
      constructing, in connection with receiving the selection, second data configured to cause the application executing on the computing device to generate a graphical representation of the selected first section in the first view;

wherein the graphical representation of the selected first section comprises an image and a graphical representation of a plurality of rows of seats in the selected first section;

wherein the image is representative of a view from a row in the plurality of rows selected by the user via the application executing on the computing device; and wherein the graphical representation of the selected first section is displayed in a foreground of the first view and overlays a portion of the interactive graphical representation of the venue other than a portion corresponding to the selected first section.

10. The computer-implemented method of claim 9, further comprising:

receiving, from the application executing on the computing device, a selection of a second section in the plurality of sections; and constructing, in connection with receiving the selection of the second section, third data configured to cause the application executing on the computing device to generate a graphical representation of the selected second section in the first view;

wherein the graphical representation of the selected first section comprises a second image and a graphical representation of a plurality of rows in the selected second section;

wherein the second image is representative of a view from a row in the plurality of rows in the selected second section selected by the user via the application executing on the computing device;

wherein the graphical representation of the selected second section is displayed in the foreground of the first view; and wherein the graphical representation of the selected first section and the graphical representation of the selected second section are non-overlapping.

11. The computer-implemented method of claim 10, wherein the graphical representation of the selected first section and the graphical representation of the selected second section are configured to move within the first view when selected by the user via the application executing on the computing device.

12. The computer-implemented method of claim 9, further comprising generating at least one of an audio signal or a dialog box comprising information associated with the selected first section.

13. The computer-implemented method of claim 9, wherein the graphical representation of the selected first section comprises at least one of a number of tickets available in the selected first section or a price range of tickets available in the selected first section.

14. The computer-implemented method of claim 9, wherein a seat in the plurality of rows is shaded a first color to indicate that the seat is available, and wherein a second seat in the plurality of rows is shaded a second color to indicate that the second seat is unavailable.

15. The computer-implemented method of claim 9, wherein the selection of the section comprises at least one of hovering an icon controlled by an input device over the section or clicking the input device when the icon is placed over the section.

16. The computer-implemented method of claim 9, further comprising constructing third data configured to cause the application executing on the computing device to generate and display an icon associated with a second section in the plurality of sections, wherein the icon represents at least one of a location in the venue where another user has purchased a ticket, a location in the venue where the user has purchased a ticket at a previous time, a rating given to the second section by other users, a location in the venue where handicap seats are available, or a location in the venue where restrooms are available.

17. A non-transitory computer-readable medium comprising one or more program instructions recorded thereon, which instructions, when executed by one or more processors, cause the one or more processors to:

construct first data configured to cause an application executing on a computing device to generate a three-dimensional graphical representation of a venue in a background of a first view, wherein the venue comprises a plurality of sections of seats, and wherein the three-dimensional graphical representation of the venue is configured to be rotated in at least one of an x, y, or z direction;

receive, from the application executing on the computing device, a selection of a first section in the plurality of sections, wherein a list of sections in the plurality of sections selected by the user are stored in a data store, and wherein the first section is a last section entered in the list;

construct, in connection with receiving the selection, second data configured to cause the application executing on the computing device to generate a graphical representation of the selected first section in the first view;

wherein the graphical representation of the selected first section comprises an image and a graphical representation of a plurality of rows of seats in the selected first section;

wherein the image is representative of a view from a row in the plurality of rows selected by the user via the application executing on the computing device; and wherein the graphical representation of the selected first section is displayed in a foreground of the first view and overlays a portion of the three-dimensional graphical representation of the venue other than a portion corresponding to the selected first section.

18. The medium of claim 17, wherein the one or more program instructions recorded thereon, when executed by the one or more processors, further cause the one or more processors to:

receive, from the application executing on the computing device, a selection of a second section in the plurality of sections; and construct, in connection with receiving the selection of the second section, third data configured to cause the application executing on the computing device to generate a graphical representation of the selected second section in the first view;

wherein the graphical representation of the selected first section comprises a second image and a graphical representation of a plurality of rows in the selected second section;

wherein the second image is representative of a view from a row in the plurality of rows in the selected second section selected by the user via the application executing on the computing device;

wherein the graphical representation of the selected second section is displayed in the foreground of the first view; and wherein the graphical representation of the selected first section and the graphical representation of the selected second section are non-overlapping.

19. The medium of claim 18, wherein the graphical representation of the selected first section and the graphical representation of the selected second section are configured to move within the first view when selected by the user via the application executing on the computing device.

20. The medium of claim 17, wherein the one or more program instructions recorded thereon, when executed by the one or more processors, further cause the one or more processors to generate at least one of an audio signal or a dialog box comprising information associated with the selected first section.

21. The medium of claim 17, wherein the graphical representation of the selected first section comprises at least one of a number of tickets available in the selected first section or a price range of tickets available in the selected first section.

22. The medium of claim 17, wherein a seat in the plurality of rows is shaded a first color to indicate that the seat is available, and wherein a second seat in the plurality of rows is shaded a second color to indicate that the second seat is unavailable.

23. The medium of claim 17, wherein the selection of the section comprises at least one of hovering an icon controlled by an input device over the section or clicking the input device when the icon is placed over the section.

24. The medium of claim 17, wherein the one or more program instructions recorded thereon, when executed by the one or more processors, further cause the one or more processors to construct third data configured to cause the application executing on the computing device to generate and display an icon associated with a second section in the plurality of sections, wherein the icon represents at least one of a location in the venue where another user has purchased a ticket, a location in the venue where the user has purchased a ticket at a previous time, a rating given to the second section by other users, a location in the venue where handicap seats are available, or a location in the venue where restrooms are available.

* * * * *